US010225768B2

(12) United States Patent
Ryu et al.

(10) Patent No.: US 10,225,768 B2
(45) Date of Patent: Mar. 5, 2019

(54) SERVING NODE RELOCATING METHOD IN WIRELESS COMMUNICATION SYSTEM AND DEVICE FOR SAME

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/773,441

(22) PCT Filed: Nov. 4, 2016

(86) PCT No.: PCT/KR2016/012700
§ 371 (c)(1),
(2) Date: May 3, 2018

(87) PCT Pub. No.: WO2017/078485
PCT Pub. Date: May 11, 2017

(65) Prior Publication Data
US 2018/0324652 A1 Nov. 8, 2018

Related U.S. Application Data

(60) Provisional application No. 62/250,515, filed on Nov. 4, 2015.

(51) Int. Cl.
H04W 36/00 (2009.01)
H04W 36/08 (2009.01)

(52) U.S. Cl.
CPC ....... H04W 36/0033 (2013.01); H04W 36/08 (2013.01)

(58) Field of Classification Search
CPC ...................................................... H04L 12/50
(Continued)

(56) References Cited

U.S. PATENT DOCUMENTS

2012/0258766 A1  10/2012  Cho et al.
2014/0221001 A1   8/2014  Yang
2018/0242206 A1*  8/2018  Kim ..................... H04W 4/06

FOREIGN PATENT DOCUMENTS

WO    2015105301    7/2015

OTHER PUBLICATIONS

"3GPP TSG SA; Architecture Enhancements to Facilitate Communications with Packet Data Networks and Applications (Release 13)," 3GPP TS 23.682 V.13.3.0, Sep. 22, 2015.
(Continued)

Primary Examiner — Dang T Ton
(74) Attorney, Agent, or Firm — Dentons US LLP

(57) ABSTRACT

Disclosed are a serving node relocating method in a wireless communication system and a device for same. In detail, a method for relocating, by a first serving node, a serving node in a wireless communication system can include: receiving a tracking area update (TAU) request message from a terminal; transmitting an update location request to a home subscriber server (HSS), when the first serving node having received the TAU request message is different from a second serving node that is an old node; and transmitting an update location message to a service capability exposure function (SCEF), when the first serving node is different from the second serving node that is the old node and a connection for transmitting/receiving non-internet protocol (non-IP) data via the SCEF is configured in the terminal.

10 Claims, 19 Drawing Sheets

(58) Field of Classification Search
USPC .......................................................... 370/329
See application file for complete search history.

(56) References Cited

OTHER PUBLICATIONS

Intel et al., "Introducing HSS-SCEF and MME/SGSN-SCEF Reference Points," S2-151271, 3GPP TSG-SA2 Meeting #108, San Jose del Cabo, Mexico, Apr. 24, 2015.

* cited by examiner

[FIG. 1]
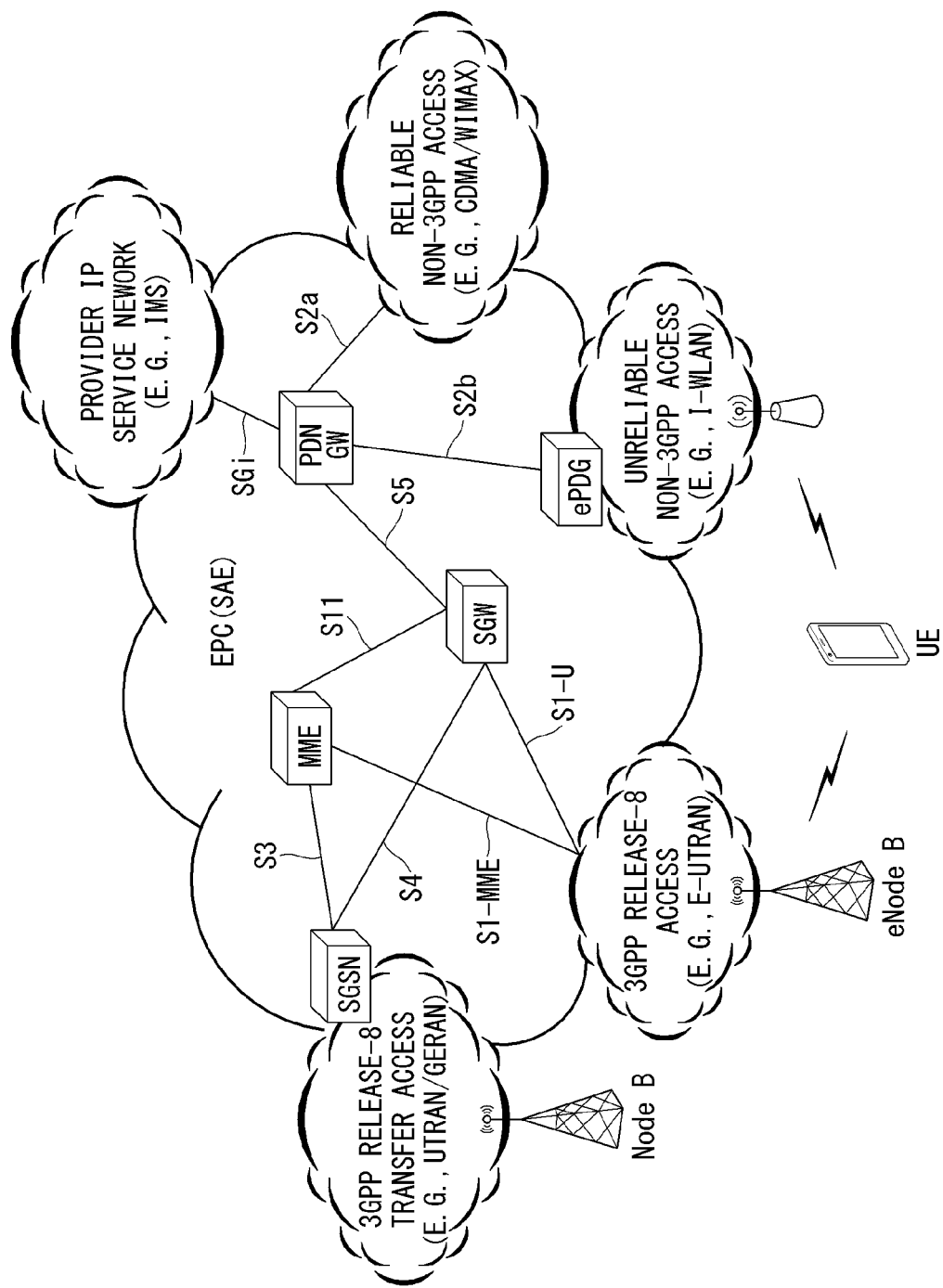

[FIG. 2]
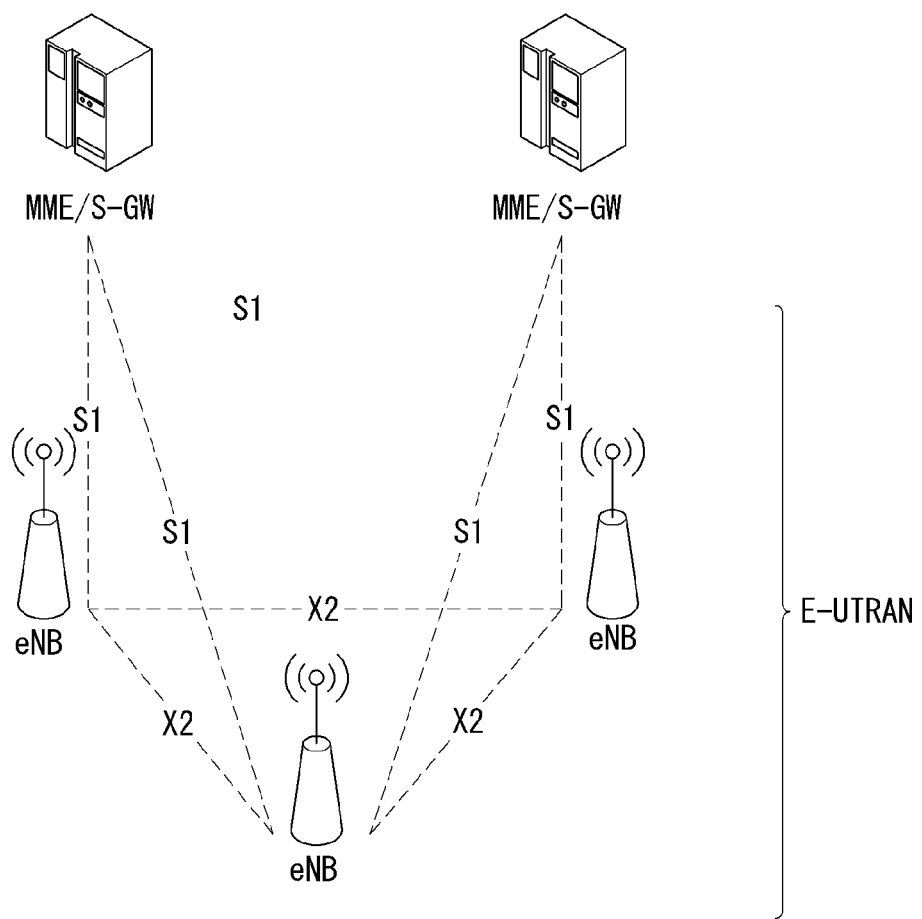

[FIG. 3]
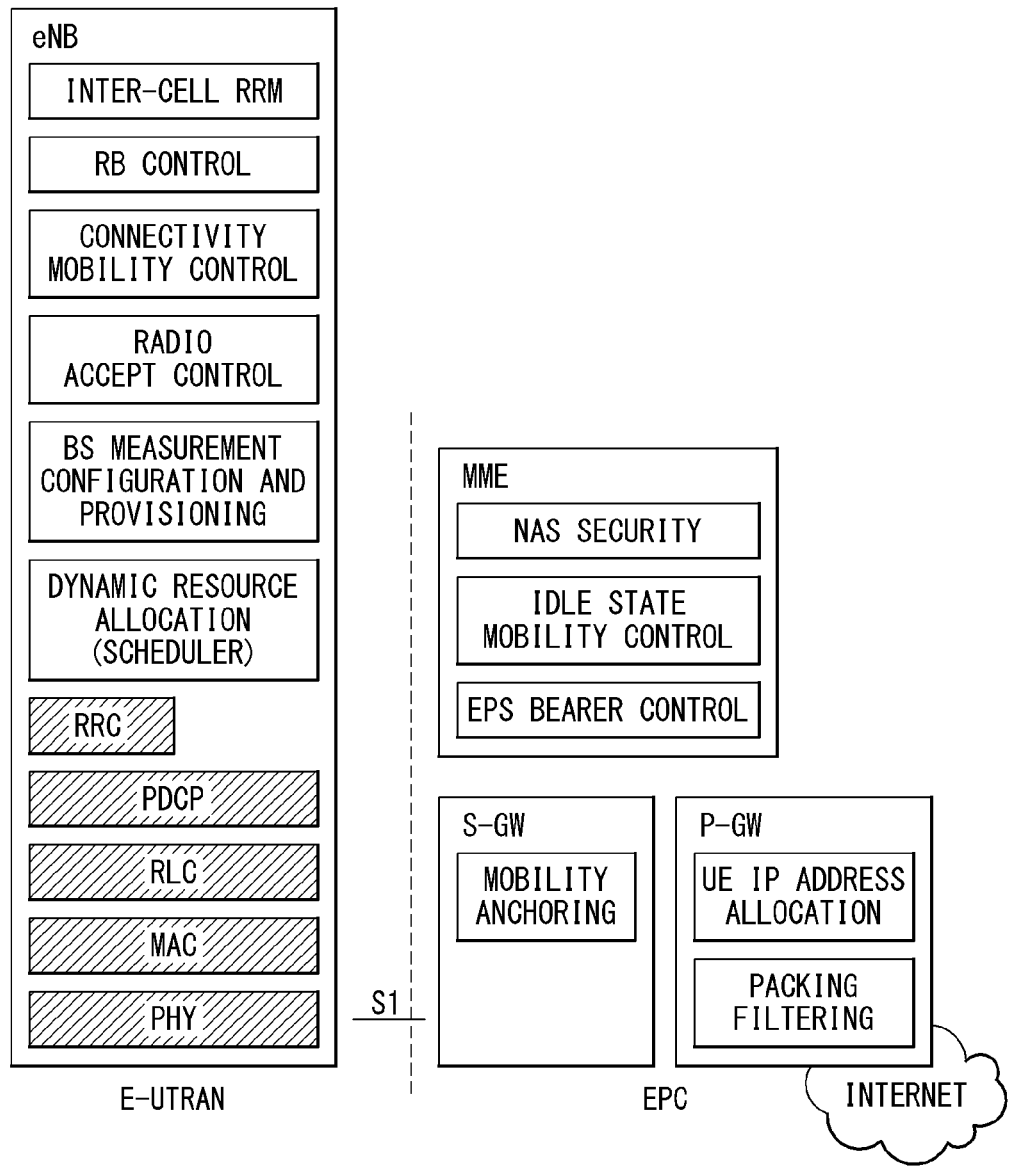

[FIG. 4]
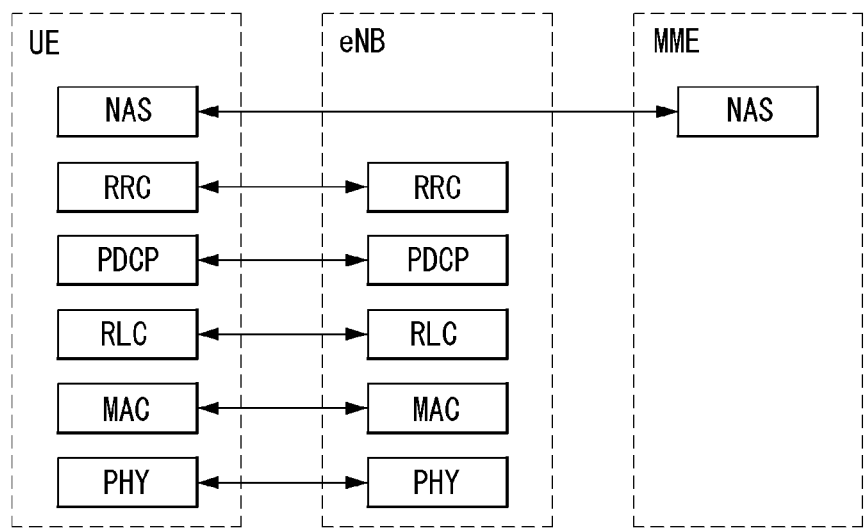
(a) CONTROL PLANE PROTOCOL STACK
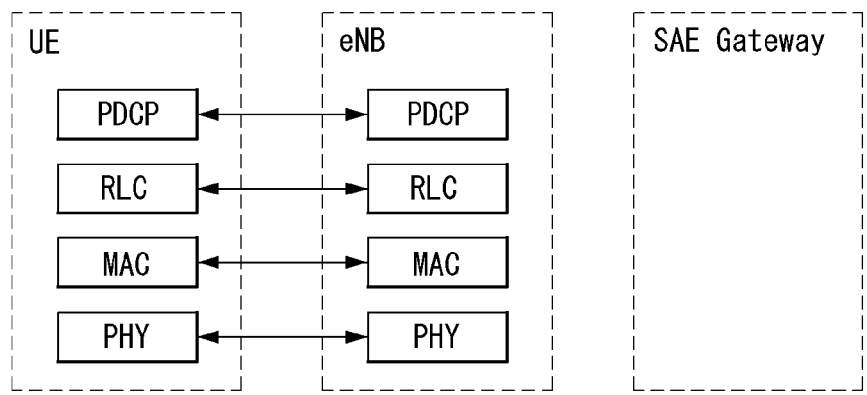
(b) USER PLANE PROTOCOL STACK

[FIG. 5]
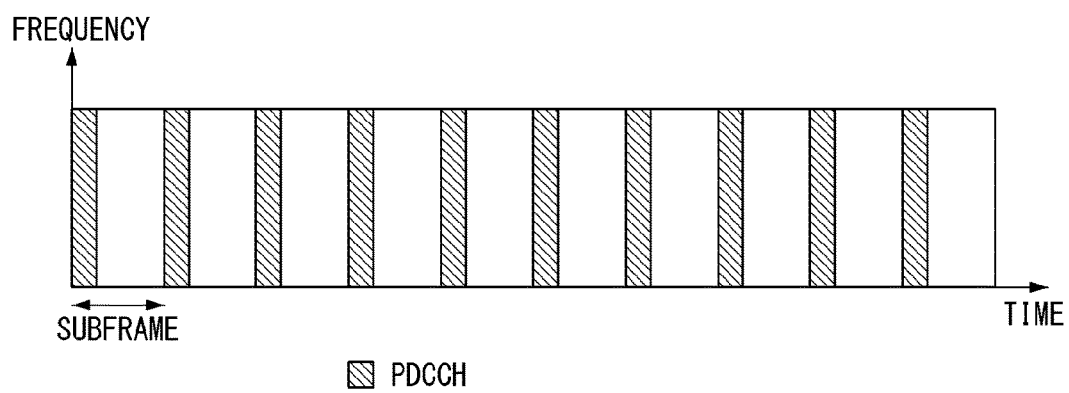
[FIG. 6]
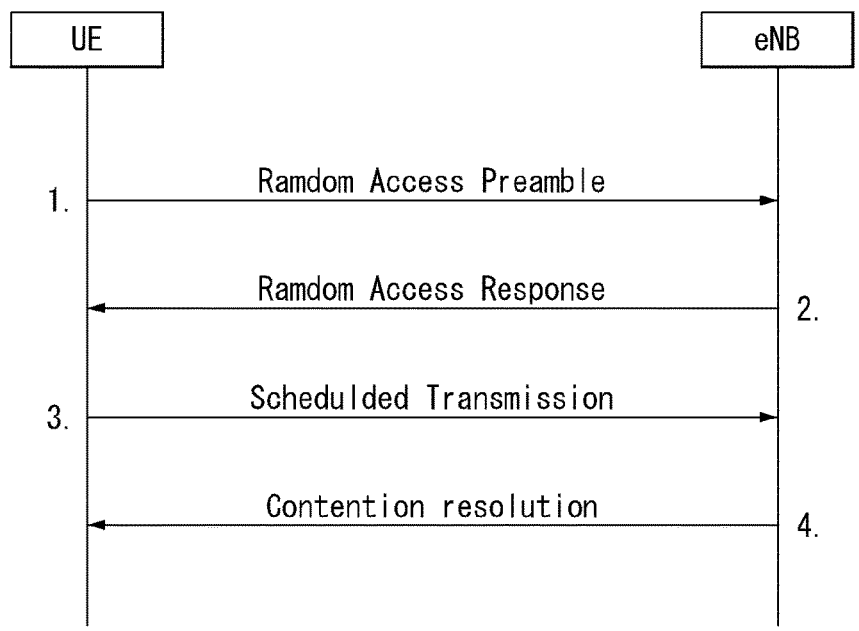

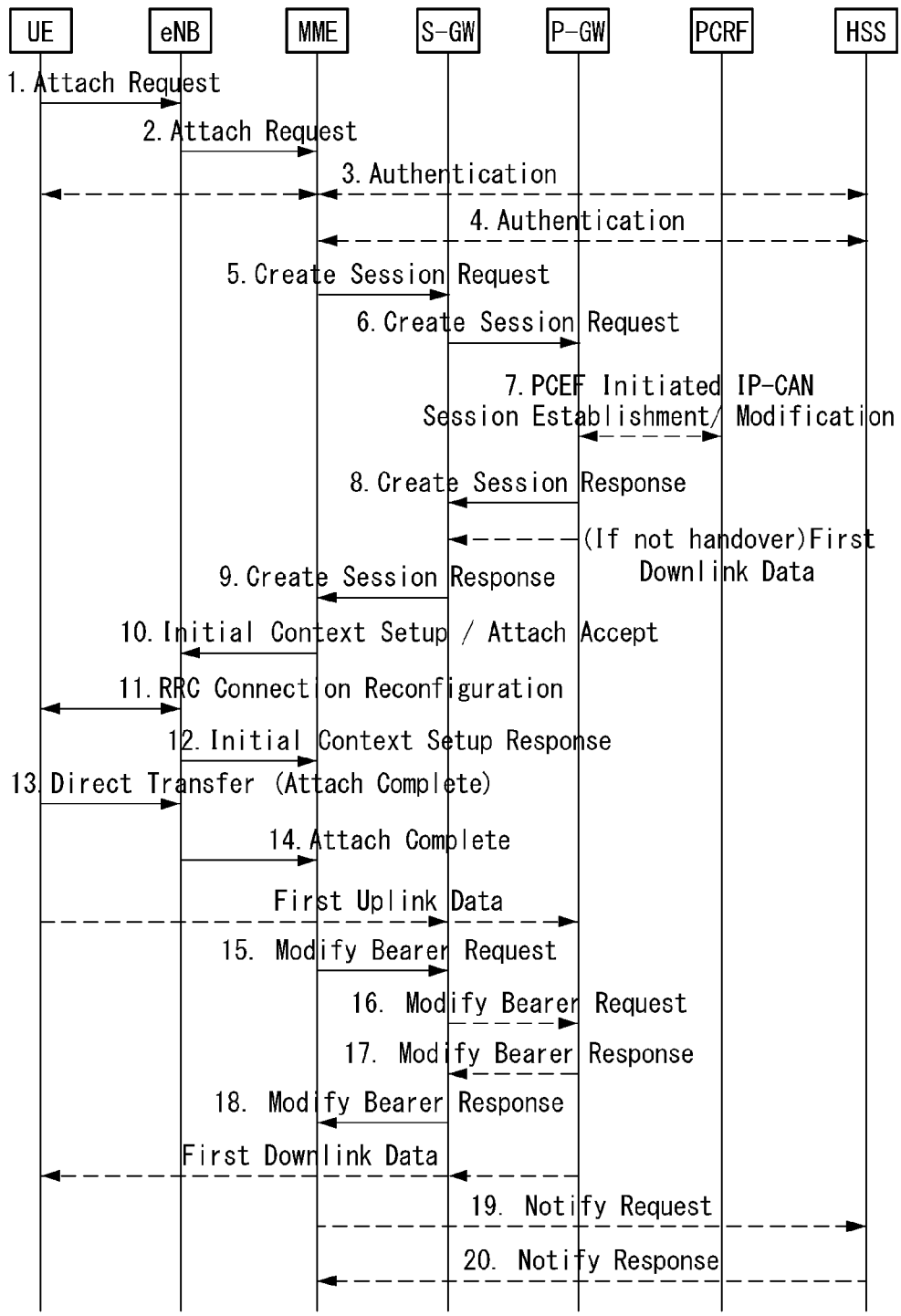
[FIG. 7]

[FIG. 8]
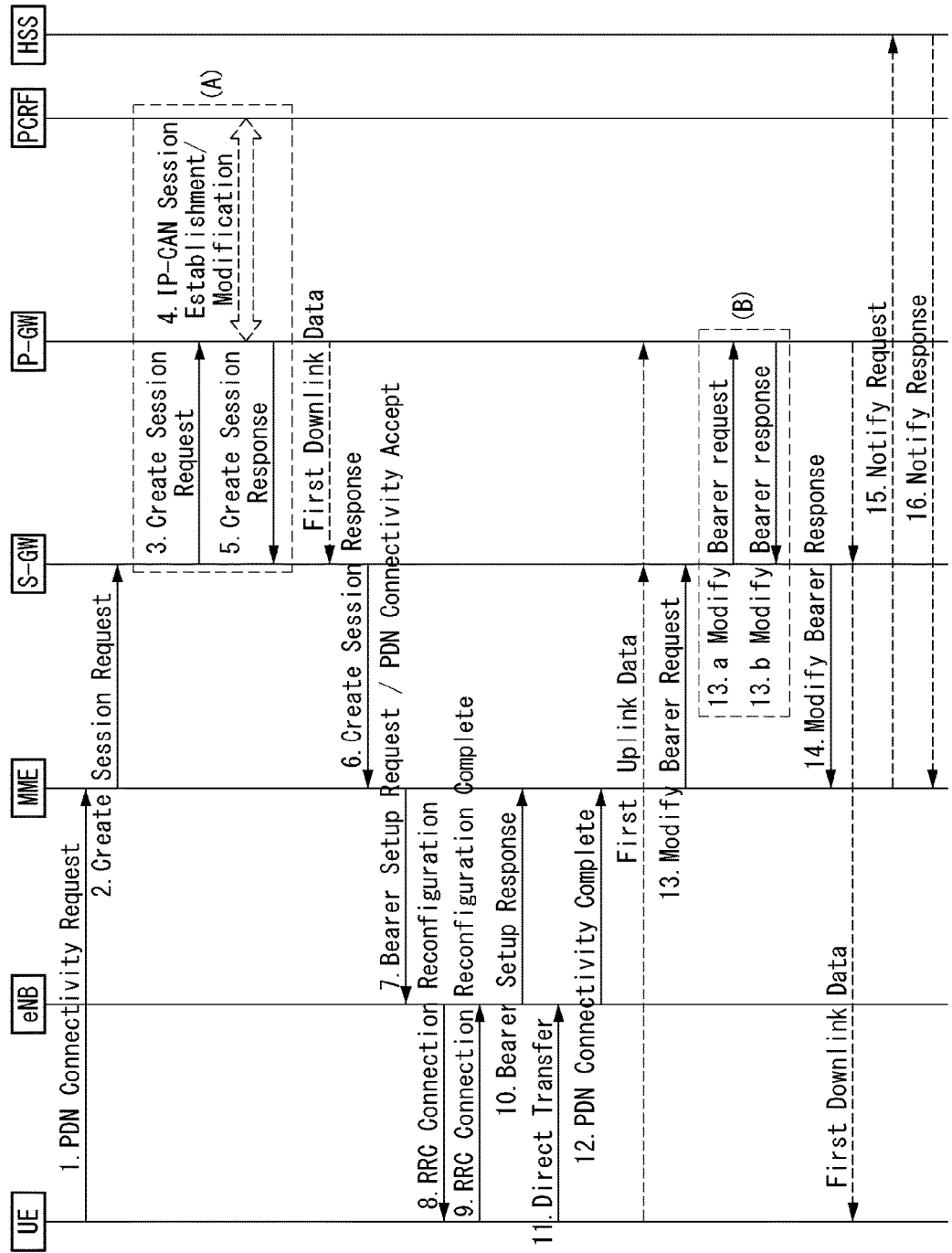

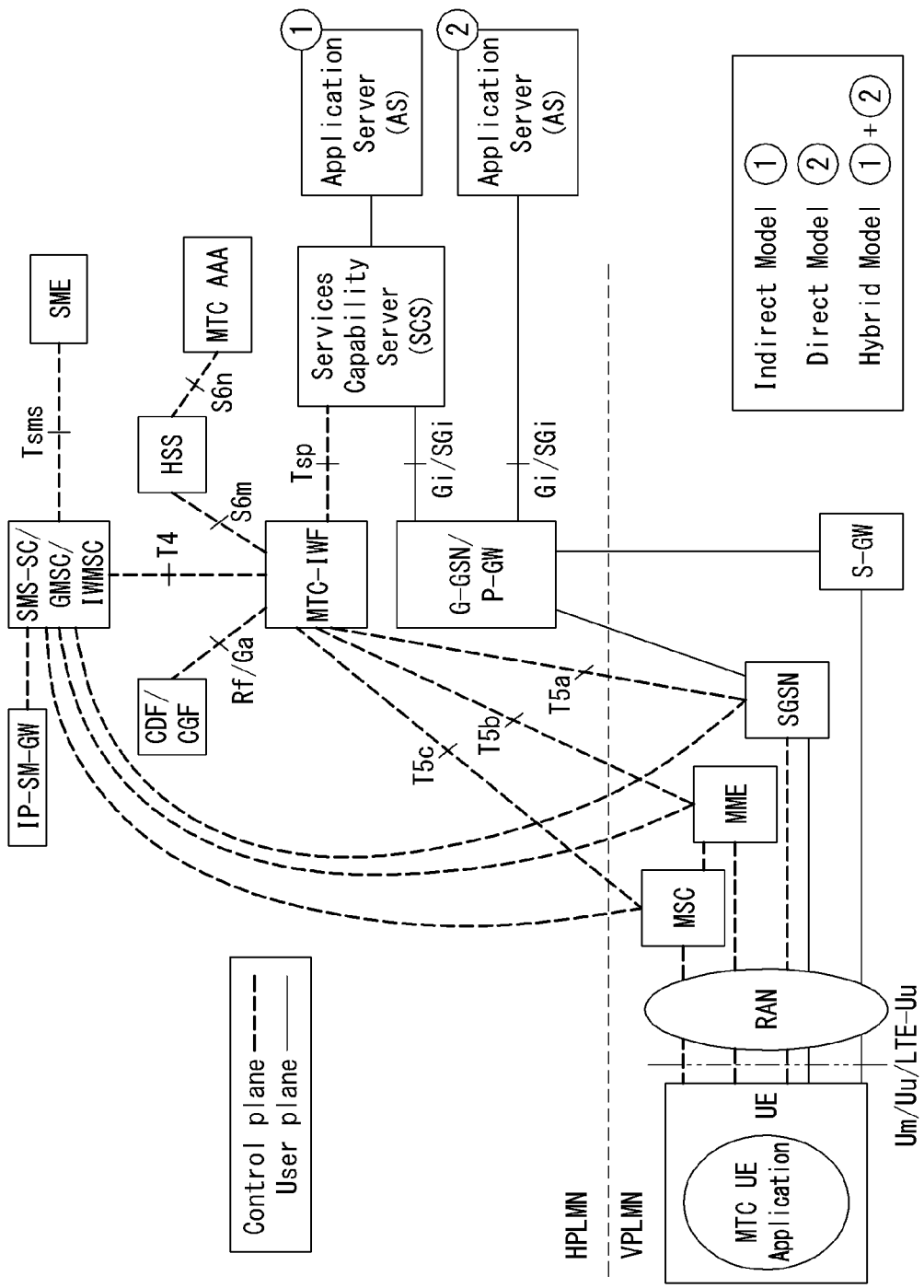
[FIG. 9]

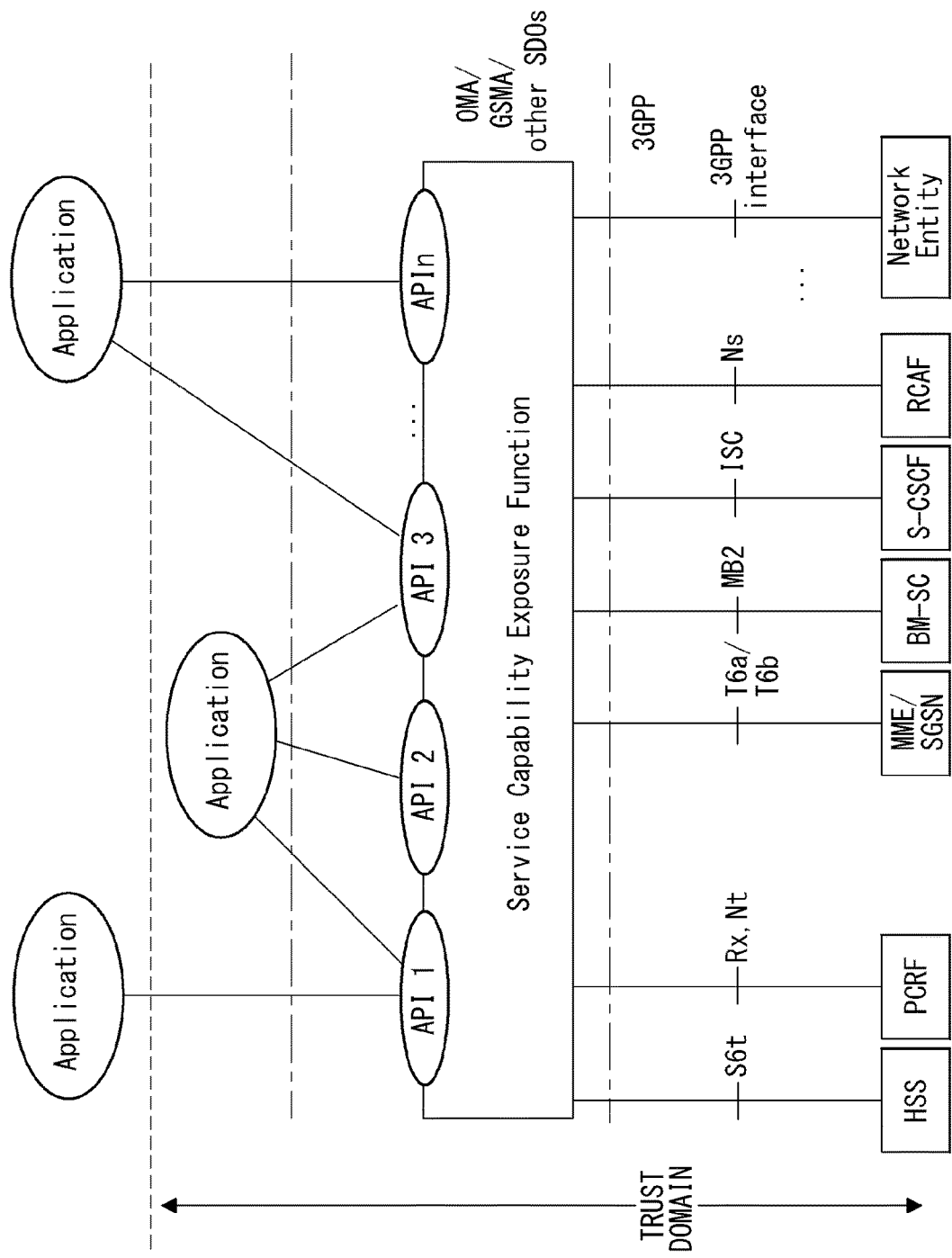
[FIG. 10]

[FIG. 11]
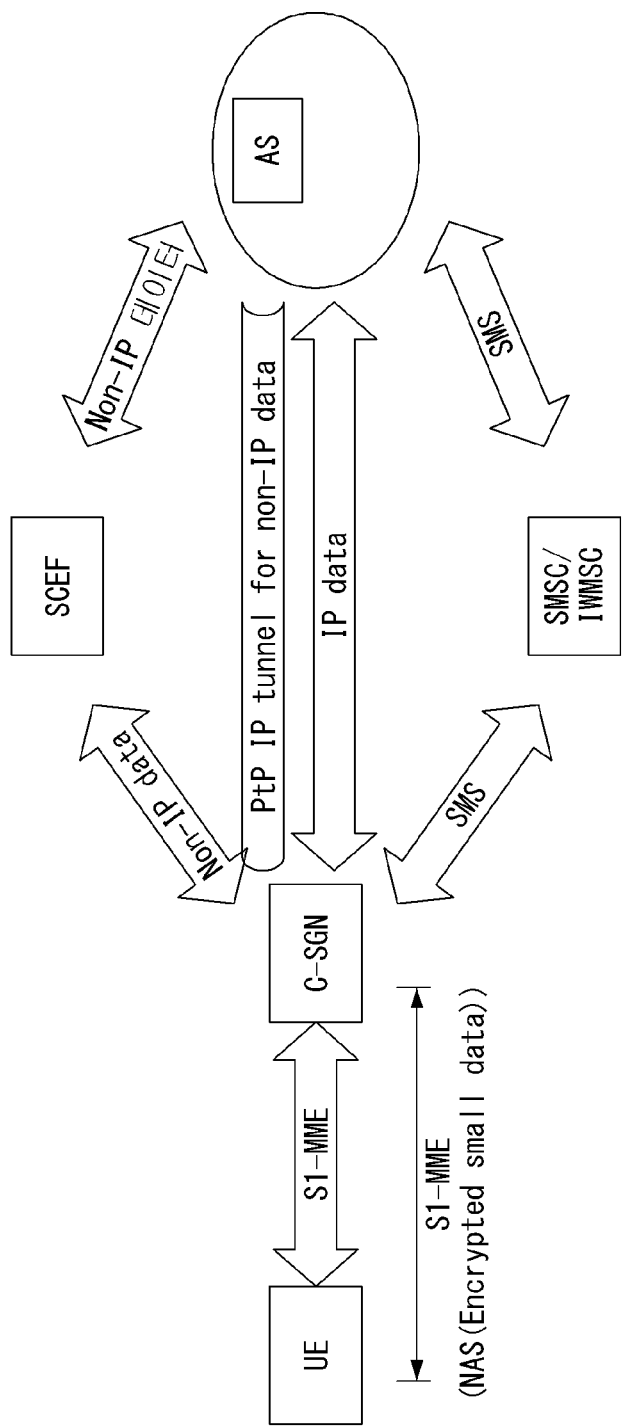

[FIG. 12]
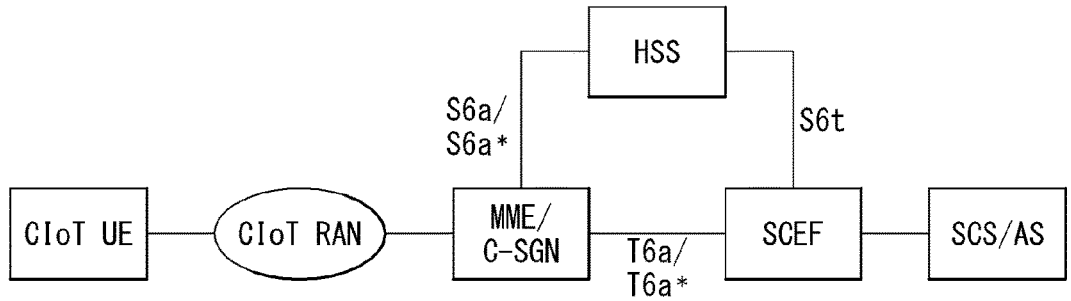
[FIG. 13]
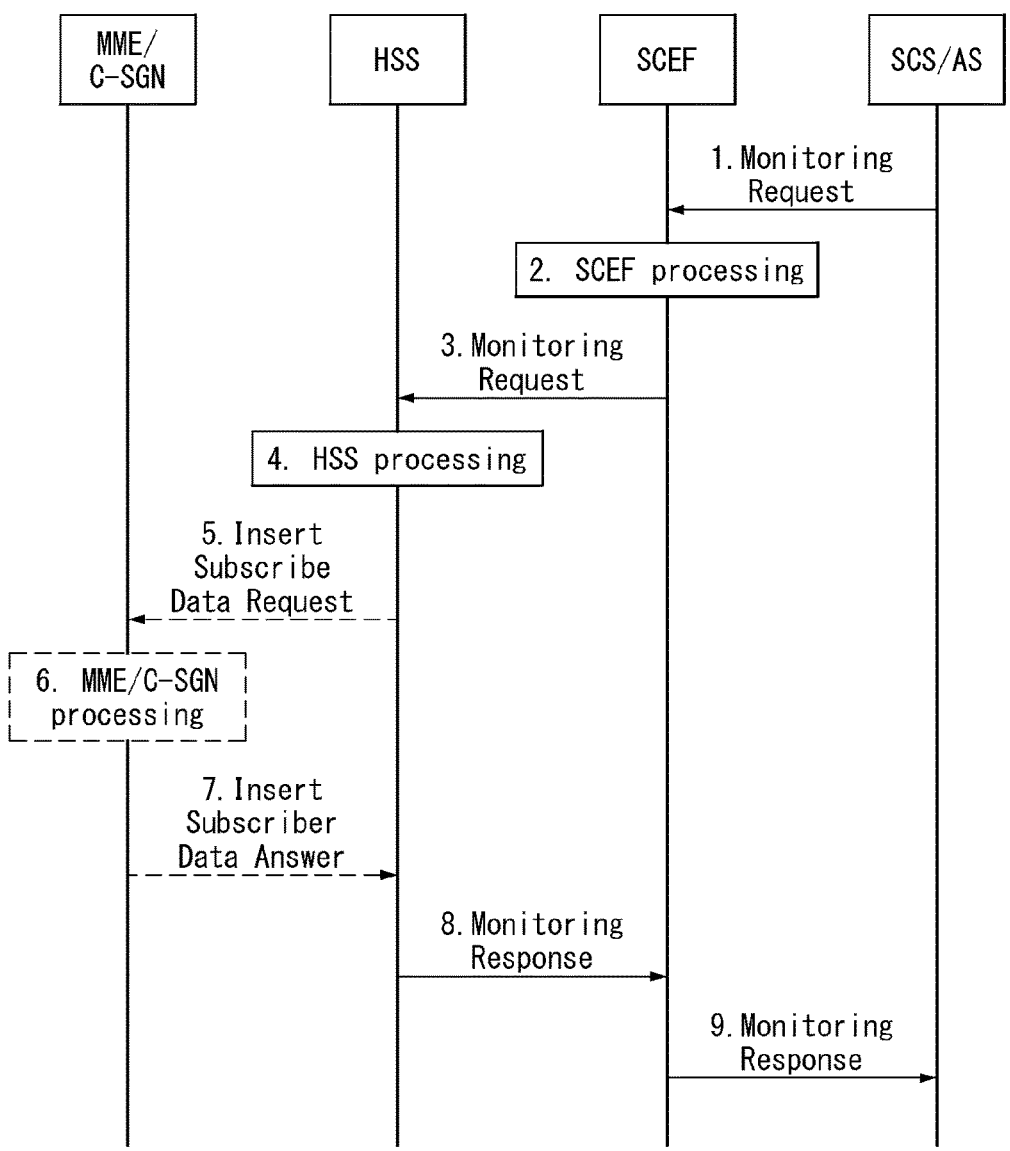

[FIG. 14]
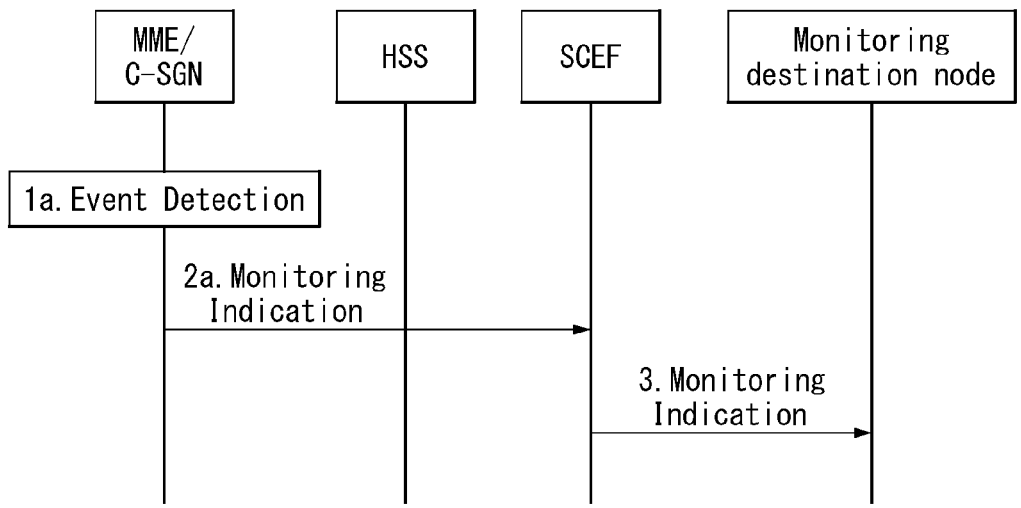
[FIG. 15]
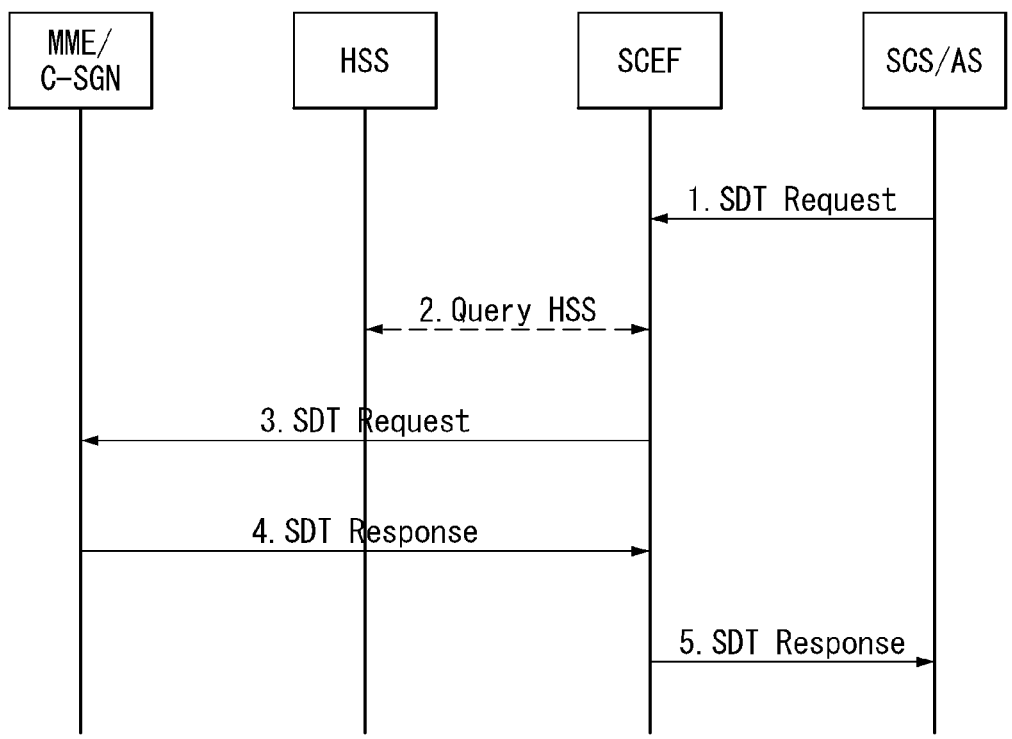

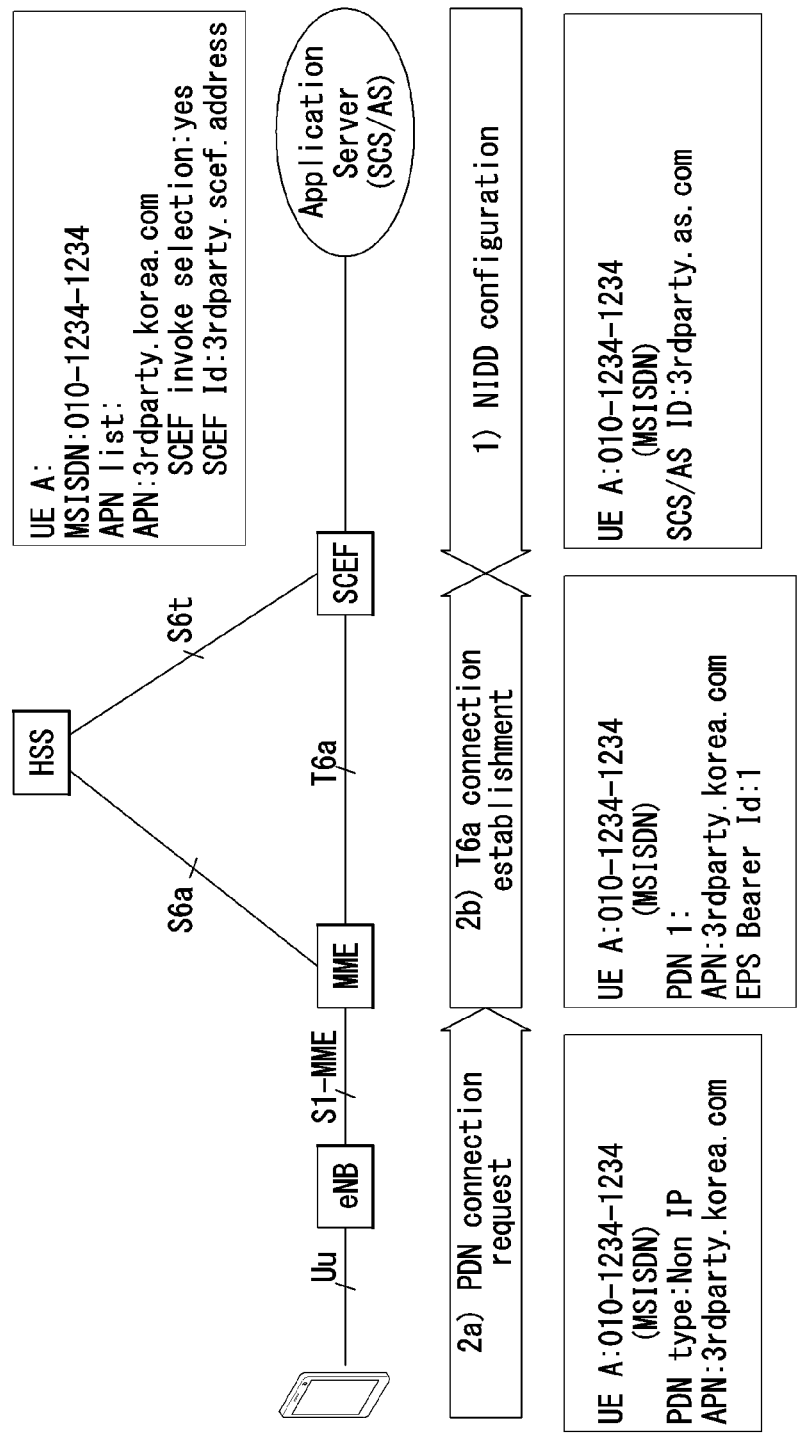
[FIG. 16]

[FIG. 17]
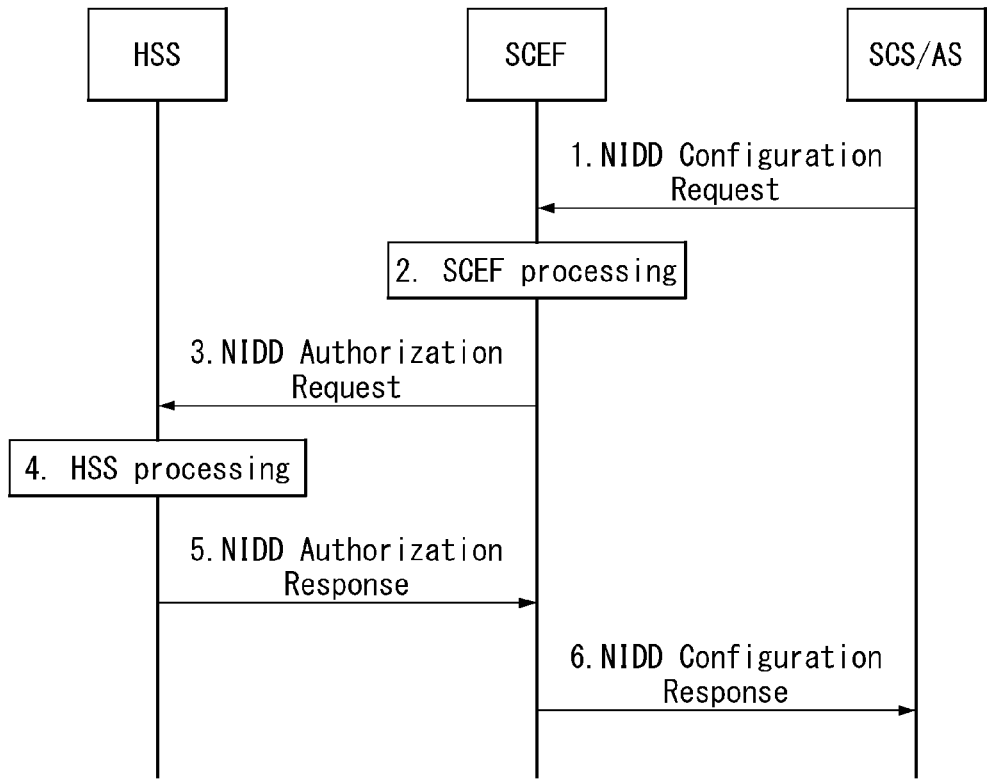
[FIG. 18]
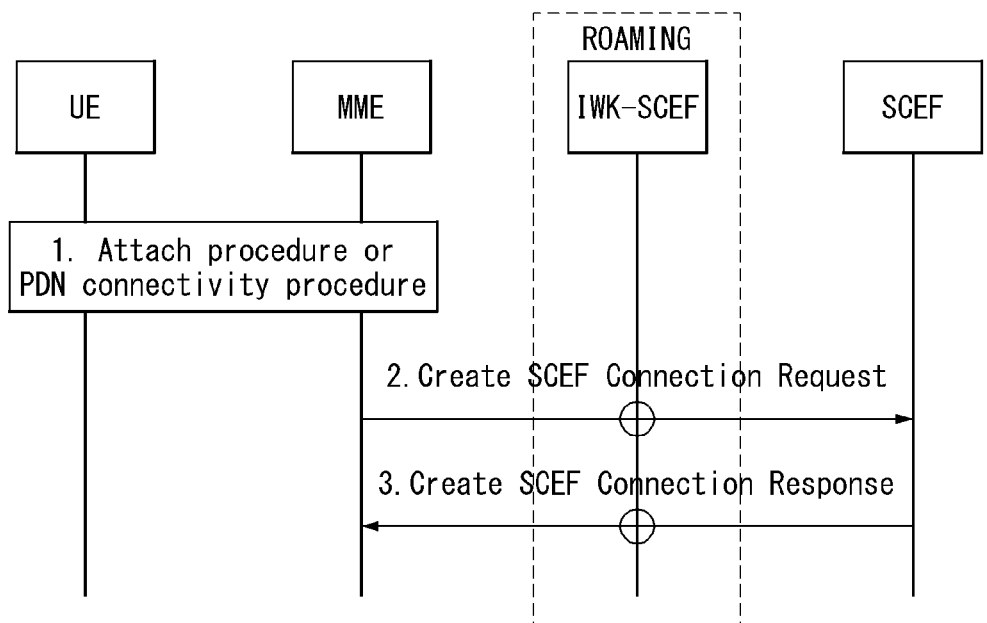

[FIG. 19]
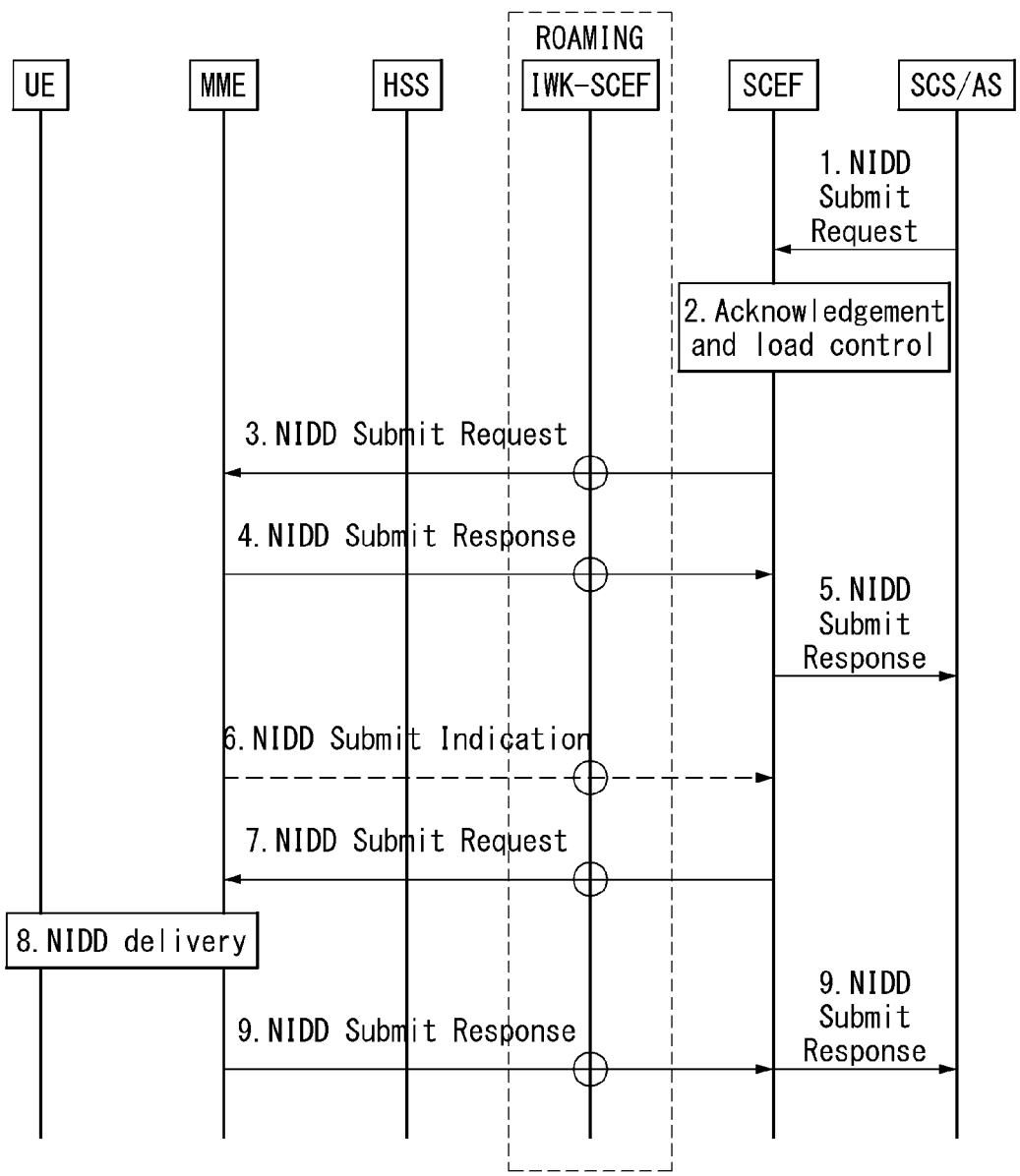

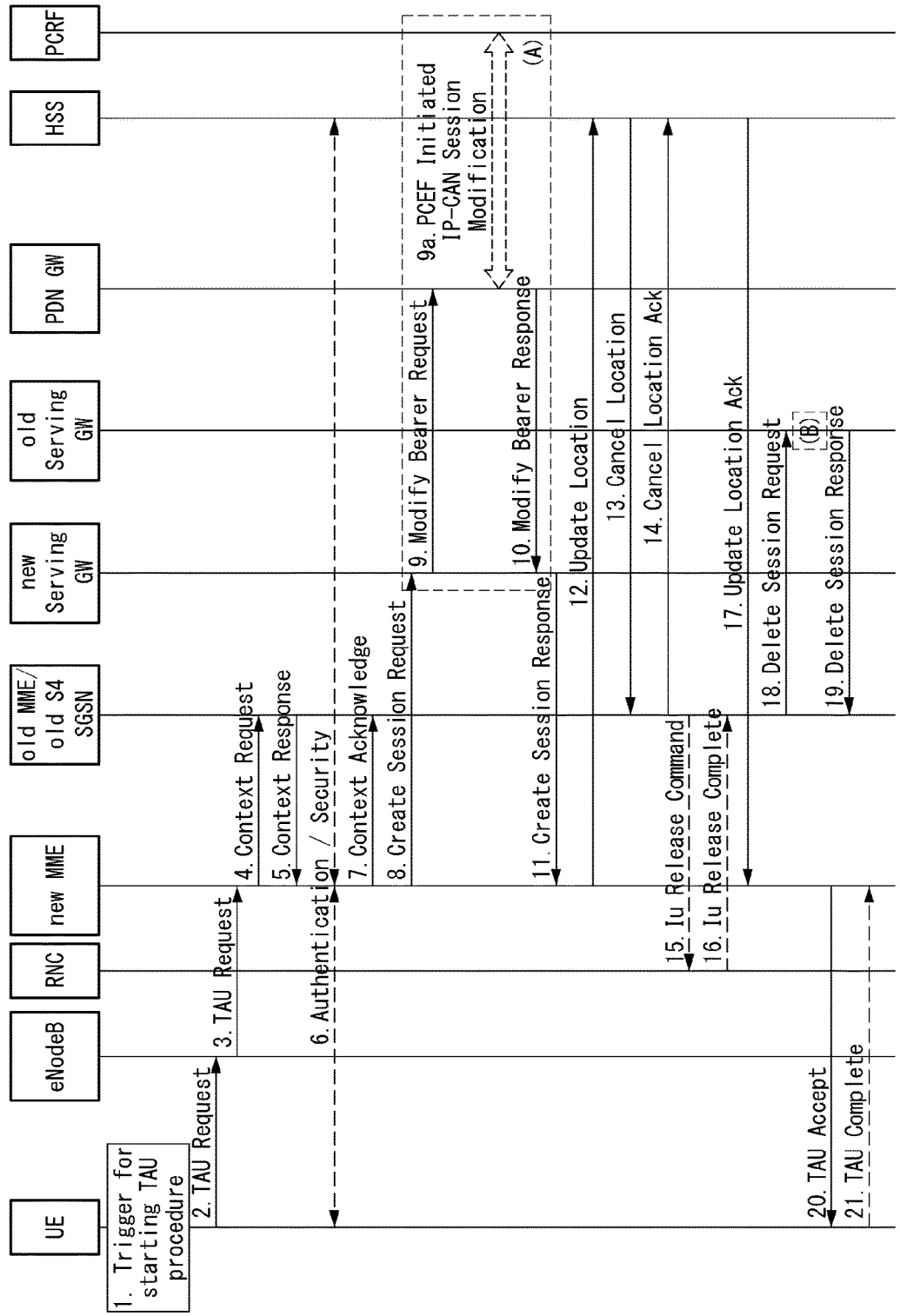
[FIG. 20]

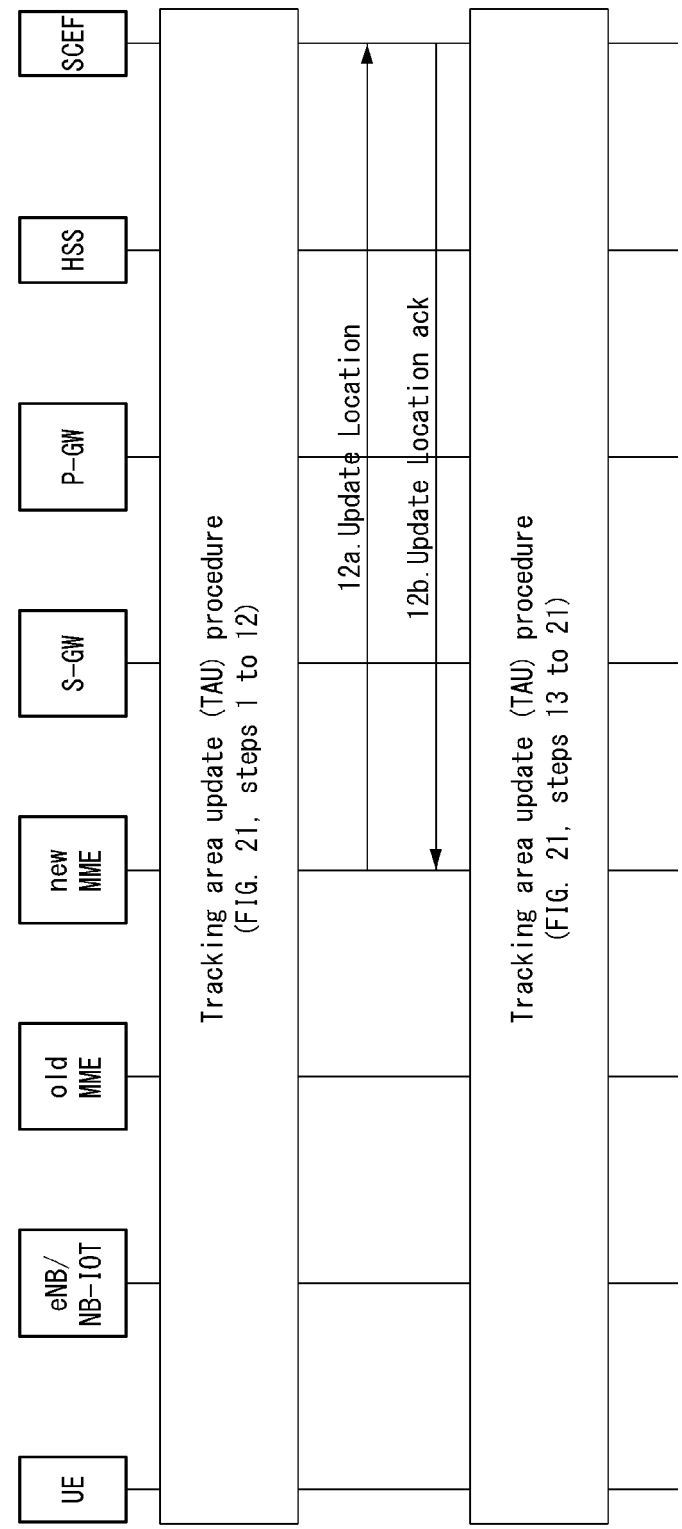

[FIG. 22]
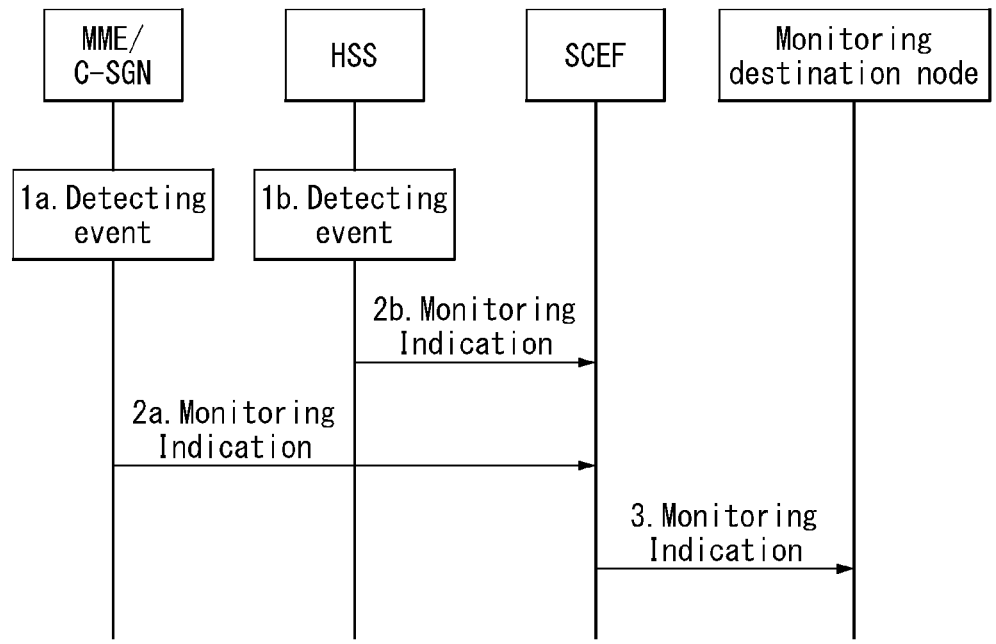
[FIG. 23]
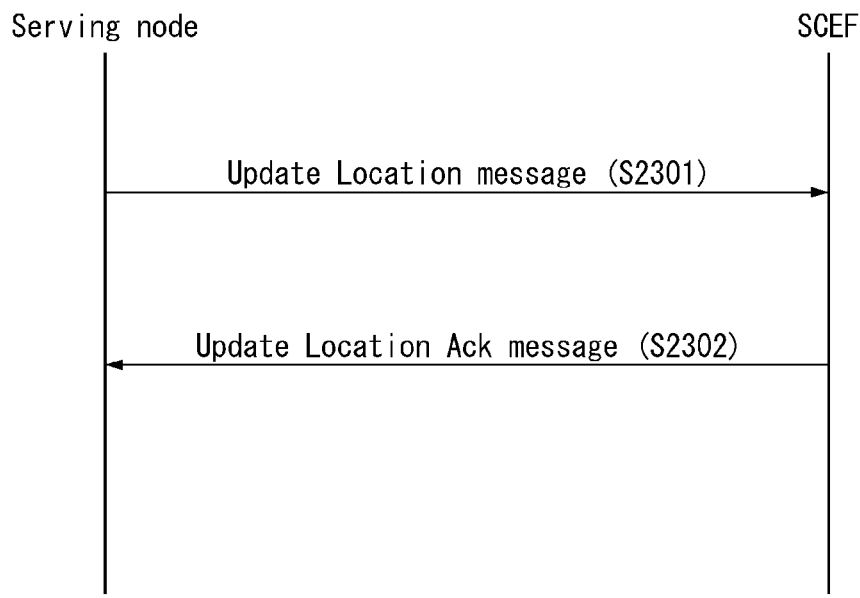

[FIG. 24]
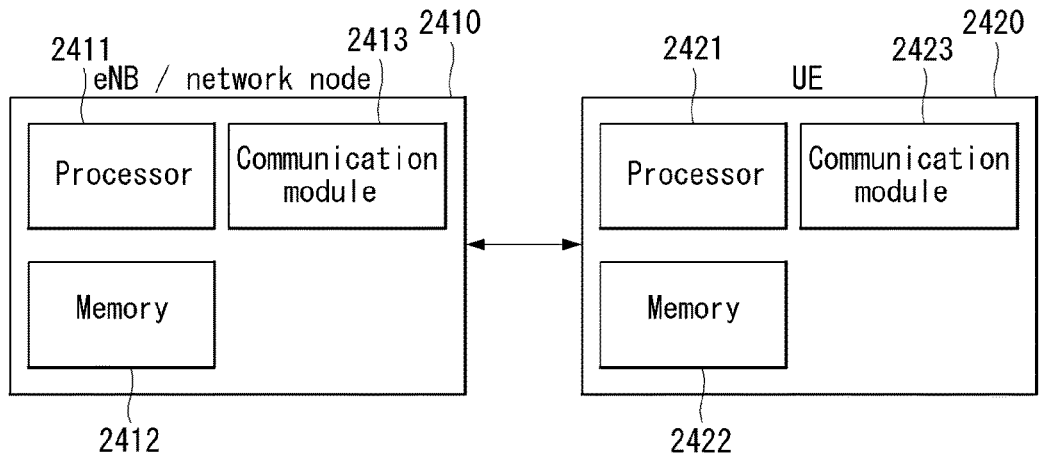
[FIG. 25]
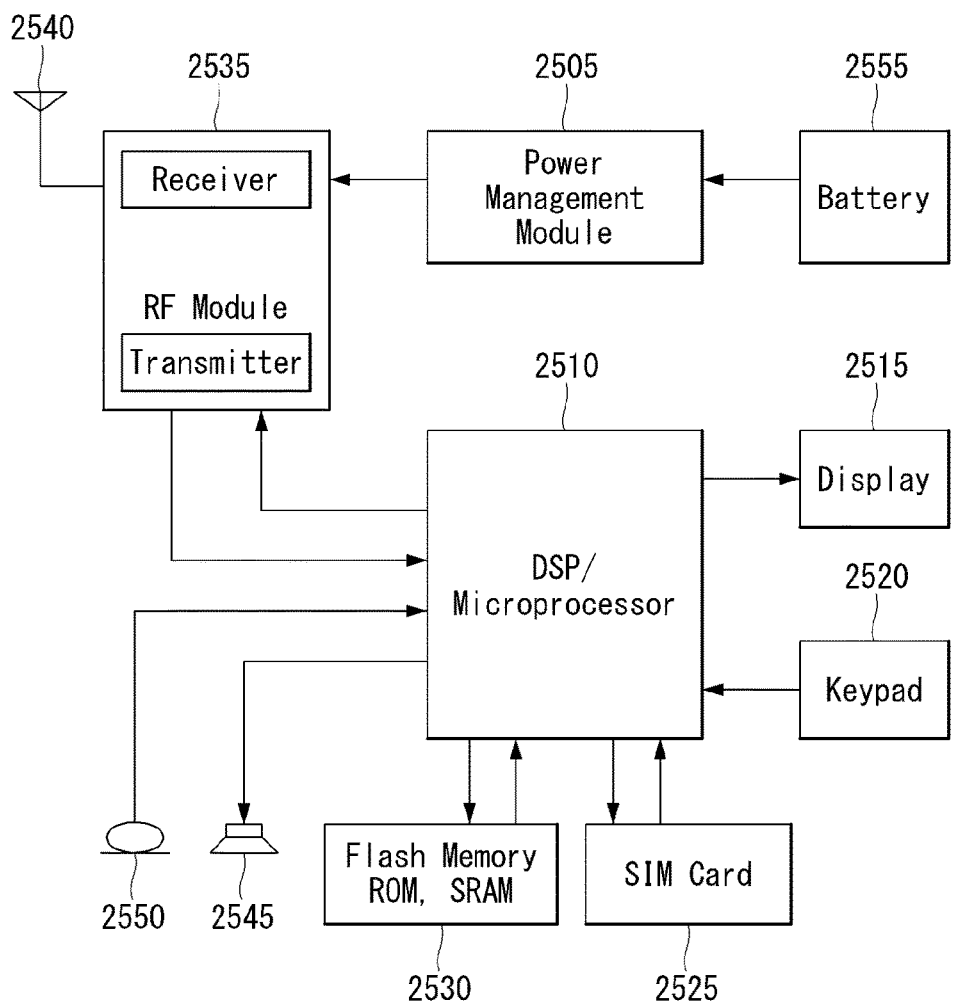

SERVING NODE RELOCATING METHOD IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2016/012700, filed on Nov. 4, 2016, which claims the benefit of U.S. Provisional Application No. 62/250,515, filed on Nov. 4, 2015, the contents of which are all hereby incorporated by reference herein in their entirety.

TECHNICAL FIELD

The present invention relates to a wireless communication system and, more specifically, to a method for performing/supporting relocation of a serving node and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a serving node relocating method for smoothly performing a mobile terminated call even when a serving node (e.g., mobility management entity (MME), serving general packet radio service (GPRS) supporting node (SGSN) or the like) of a UE is changed during transmission of small data (e.g., non-IP data) using a service capability exposure function (SCEF).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for relocating, by a first serving node, a serving node in a wireless communication system may include: receiving a tracking area update (TAU) request message from a UE; transmitting an update location request to a home subscriber server (HSS) when the first serving node having received the TAU request message is different from a second serving node that is an old node; and transmitting an update location message to a service capability exposure function (SCEF) when the first serving node is different from the second serving node that is the old node and a connection for transmitting/receiving non-Internet protocol (non-IP) data via the SCEF is configured for the UE.

In another aspect of the present invention, a first serving node for relocating a serving node in a wireless communication system may include: a communication module for transmitting/receiving signals; and a processor for controlling the communication module, wherein the processor is configured: to receive a tracking area update (TAU) request message from a UE; to transmit an update location request to a home subscriber server (HSS) when a first serving node having received the TAU request message is different from a second serving node that is an old node; and to transmit an update location message to a service capability exposure function (SCEF) when the first serving node having received the TAU request message is different from the second serving node that is the old node and a connection for transmitting/receiving non-Internet protocol (non-IP) data via the SCEF is configured for the UE.

Preferably, when the first serving node is different from the second serving node that is the old node, a context request message may be transmitted to the second serving node in order to retrieve a UE context, a context response message including the UE context may be received from the second serving node in response to the context request message, and whether the connection for transmitting/receiving non-IP data is configured for the UE may be determined using the UE context.

Preferably, when the type of a PDN connection between the UE and a packet data network (PDN) is non-IP, and subscription information corresponding to the PDN connection includes an Invoke SCEF Selection indicator, it may be determined that the connection for transmitting/receiving non-IP data via the SCEF is configured for the UE.

Preferably, when notification to the SCEF for a relocation of the serving node is configured in the first serving node, the update location message may be transmitted to the SCEF.

Preferably, an update location acknowledgement message for acknowledging location update may be received from the SCEF in response to the update location message.

Preferably, when non-IP data to be transmitted to the UE is received from the SCEF, the non-IP data may be included in a non-access stratum packet data unit (NAS PDU) and transmitted it to the UE.

Advantageous Effects

According to embodiments of the present invention, a mobile terminated call can be smoothly transmitted without being lost because the SCEF can recognize the most recent serving node.

According to embodiments of the present invention, signaling overhead can be reduced because the SCEF may not send a query about the location of a serving node (i.e., routing information) to a home subscriber server (HSS) when a mobile terminated call is transmitted.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 is a diagram schematically showing a structure of a physical channel in a wireless communication system to which the present invention may be applied.

FIG. 6 is a diagram for describing a contention based random access procedure in a wireless communication system to which the present invention may be applied.

FIG. 7 is a diagram schematically showing an attach procedure in a wireless communication system to which the present invention may be applied.

FIG. 8 is a diagram schematically showing a PDN connectivity procedure in a wireless communication system to which the present invention may be applied.

FIG. 9 is a diagram showing an architecture for machine-type communication (MTC) in a wireless communication system to which the present invention may be applied.

FIG. 10 is a diagram showing an architecture for service capability exposure in a wireless communication system to which the present invention may be applied.

FIG. 11 is a diagram showing an end-to-end small data flow in a wireless communication system to which the present invention may be applied.

FIG. 12 shows a cellular IoT network architecture proposed for efficient non-IP small data transmission through an SCEF in a wireless communication system to which the present invention may be applied.

FIG. 13 shows a procedure of configuring and deleting a monitoring event through an HSS in a wireless communication system to which the present invention may be applied.

FIG. 14 shows an MO small data transmission procedure in a wireless communication system to which the present invention may be applied.

FIG. 15 shows an MT small data transmission procedure in a wireless communication system to which the present invention may be applied.

FIG. 16 shows a link setup process for transmitting UL/DL data (i.e., non-IP data) through an MME and an SCEF in a wireless communication system to which the present invention may be applied.

FIG. 17 shows an NIDD configuration procedure in a wireless communication system to which the present invention may be applied.

FIG. 18 shows a T6 a connection establishment procedure in a wireless communication system to which the present invention may be applied.

FIG. 19 shows a mobile terminated NIDD procedure in a wireless communication system to which the present invention may be applied.

FIG. 20 shows a tracking area update procedure in a wireless communication system to which the present invention may be applied.

FIG. 21 is a diagram showing a serving node relocating method according to an embodiment of the present invention.

FIG. 22 is a diagram showing a serving node relocating method according to an embodiment of the present invention.

FIG. 23 is a diagram showing a serving node relocating method according to an embodiment of the present invention.

FIG. 24 is a block diagram of a communication device according to an embodiment of the present invention.

FIG. 25 is a block diagram of a communication device according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to which the Present Invention may be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference point | Description |
|---|---|
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PH ICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Attach Procedure

FIG. 7 is a diagram schematically showing an attach procedure in a wireless communication system to which the present invention may be applied.

The attach procedure is used for a UE to set connection to a network when entering an E-URAN cell, in general. In addition, it may be used for handover from a non-3GPP network to the E-UTRAN.

1-2. A UE starts the attach procedure by transmitting an Attach Request message to an MME.

The Attach Request message includes international mobile subscriber identity (IMSI) of the UE and a PDN type requested by the UE. Here, the PDN type indicates an IP version (i.e., IPv4, IPv4v6 or IPv6) requested by the UE.

The Attach Request message is included in an RRC Connection Setup Complete message and transmitted in RRC connection and included in an initial UE message and transmitted in S1 signaling connection.

The UE may transmit the Attach Request message along with a PDN connectivity request in order to request PDN connectivity.

3. The MME sends a request for information for UE authentication to an HSS for UE authentication and performs mutual authentication with the UE.

4. The MME registers the location of the UE with the HSS and receives user subscription information (i.e., a subscribed QoS profile) from the HSS in order to generate a default bearer for the UE.

Here, subscription information does not include IP address information about the corresponding UE in the case of dynamic IP address allocation, whereas the subscription information includes static IP address information allocated to the corresponding UE in the case of static IP address allocation.

5. The MME allocates a default EPS bearer ID and transmits a Create Session Request message to an S-GW.

The Create Session Request message includes the IMSI of the UE, an EPS bearer ID, a P-GW ID (i.e., P-GW address) selected by the MME to generate an EPS bearer, an APN, the subscribed QoS profile received from the HSS, the PDN type, the IP address (i.e., PDN address) of the UE, etc.

Here, the PDN type equally includes the PDN type information received from the UE. The IP address of the UE may be set to 0 in the case of dynamic IP address allocation and set to static IP address information (included in the subscription information) allocated to the corresponding UE in the case of static IP address allocation.

6. The S-GW allocates an S5 S-GW tunnel endpoint identifier (TEID) to a P-GW included in the Create Session Request message received from the MME in order to generate an S5 bearer and transmits the Create Session Request message to the P-GW.

The Create Session Request message includes the IMSI of the UE, the EPS bearer ID, an S5 S-GW TEID, the APN, the subscribed QoS profile, the PDN type (i.e., IP version), the IP address (i.e., PDN address) of the UE, etc.

7. The P-GW allocates an Internet protocol (IP) address to be used by the UE and performs an IP connectivity access network (IP-CAN) session establishment/modification procedure with a PCRF.

Here, the P-GW may allocate an IP address selected from an IP address pool held by the P-GW to the UE in the case of dynamic IP address allocation, and the static IP address information (included in the subscription information) allocated to the corresponding UE may be equally allocated in the case of static IP address allocation.

8. The P-GW allocates a P-GW TEID to the S-GW in order to generate an S5 bearer and transmits a Create Session Response message to the S-GW in response to the Create Session Request message.

The Create Session Response message includes the IMSI of the UE, the EPS bearer ID, the S5 P-GW TEID, the subscribed QoS profile, the PDN type, the IP address (i.e., PDN address) allocated to the UE, etc.

If the P-GW selects a different PDN type from the requested PDN type, the P-GW indicates the PDN type and the cause of modification of the PDN type to the UE.

When this procedure is finished, generation of the S5 bearer between the S-GW and the P-GW is completed and thus the S-GW may transmit uplink traffic to the P-GW or receive downlink traffic from the P-GW.

9. The S-GW allocates an S1 S-GW TEID in order to generate an S1 bearer and transmits a Create Session Response message to the MME in response to the Create Session Request message.

The Create Session Response message includes the IMSI of the UE, the EPS bearer ID, the S1 S-GW TEID, the PDN type, the IP address (i.e., PDN address) allocated to the UE, etc.

10-11. The MME transmits an Attach Accept message to the UE in response to the Attach Request message.

The Attach Accept message includes the EPS bearer ID, the APN, the IP address (i.e., PDN address) of the UE allocated by the P-GW, the PDN type, a TAI (Tracking Area Identity) list, a TAU timer, etc.

The Attach Accept message is included in an Initial Context Setup Request and delivered to an eNB in S1 signaling connection.

When this procedure is finished, generation of an uplink S1 bearer between the eNB and the S-GW is completed and the eNB may transmit uplink traffic to the S-GW.

In addition, the Attach Accept message is included in an RRC Connection Reconfiguration message and delivered from the eNB to the UE in RRC connection.

When this procedure is finished, generation of DRB between the UE and the eNB is completed and the UE may transmit uplink traffic to the eNB or receive downlink traffic from the eNB.

12. The eNB transmits an Initial Context Setup Response message to the MME in response to the Initial Context Setup Request message. The Initial Context Setup Response message includes an S1 eNB TEID and the like.

13-14. The UE transmits an Attach Complete message to the MME in response to the Attach Accept message.

The Attach Complete message is included in a UL Information Transfer message and transmitted in RRC connection and is included in an Uplink NAS Transport message and transmitted in S1 signaling connection.

When this procedure is finished, generation of an uplink default EPS bearer between the UE and the P-GW is completed and the UE may transmit uplink data to the P-GW.

15. The MME delivers the S1 eNB TEID received from the eNB to the S-GW through a Modify Bearer Request message.

When this procedure is finished, generation of a downlink S1 bearer between the eNB and the S-GW is completed and the eNB may receive downlink traffic from the S-GW.

16-17. The bearer between the S-GW and the P-GW is updated as necessary.

18. The S-GW transmits a Modify Bearer Response message to the MME in response to the Modify Bearer Request message.

When this procedure is finished, generation of a downlink default EPS bearer between the UE and the P-GW is completed and thus the P-GW may transmit downlink data to the UE. That is, a connection between the UE and the PDN is established, and the UE may be provided with a PDN service using the allocated IP address.

19. The MME transmits a Notify Request message including a P-GW ID (i.e., P-GW address) and APN to the HSS as necessary.

20. The HSS stores the P-GW ID (i.e., P-GW address) and associated APN and transmits a Notify Response message to the MME.

PDN Connectivity Procedure

A UE requested PDN connectivity procedure is used for a UE to request connection (including allocation of a default bearer) to an additional PDN through E-UTRAN.

FIG. 8 is a diagram schematically showing a PDN connectivity procedure in a wireless communication system to which the present invention may be applied.

1. A UE initiates a UE requested PDN procedure by transmitting a PDN connectivity request message to an MME.

The PDN connectivity request message includes an APN, a PDN type (i.e., IP version) requested by the UE, etc. As described above, the PDN types indicates an IP version (i.e., IPv4, IPv4v6 or IPv6) requested by the UE.

An MME verifies whether the APN provided by the UE is permitted according to subscription information. If the UE does not provide the APN to the PDN connectivity request message, the MME uses an APN from a default PDN subscription context.

2. The MME allocates an EPS bearer ID and transmits a Create Session Request message to an S-GW.

The Create Session Request message includes the IMSI of the UE, the EPS bearer ID, a P-GW ID (i.e., P-GW address) selected by the MME for EPS bearer generation, an APN, a subscribed QoS profile received from an HSS, a PDN type, the IP address (i.e., PDN address) of the UE, etc.

Here, the PDN type equally includes PDN type information received from the UE. The IP address of the UE may be set to 0 in the case of dynamic IP address allocation and may be set to static IP address information (included in subscription information) allocated to the corresponding UE in the case of static IP address allocation.

3. An S-GW allocates an S5 S-GW TEID to a P-GW included in the Create Session Request message received from the MME in order to generate an S5 bearer and transmits a Create Session Request message to the P-GW.

The Create Session Request message includes the IMSI of the UE, the EPS bearer ID, the S5 S-GW TEID, the APN, the subscribed QoS profile, the PDN type (i.e., IP version), the IP address (i.e., PDN address) of the UE, etc.

4. The P-GW allocates an IP address to be used by the UE and performs an IP-CAN session establishment/modification procedure with a PCRF.

Here, the P-GW may allocate an IP address selected from an IP address pool held by the P-GW to the UE in the case of dynamic IP address allocation, and the static IP address information (included in the subscription information) allocated to the corresponding UE may be equally allocated in the case of static IP address allocation.

5. The P-GW allocates a P-GW TEID to the S-GW in order to generate an S5 bearer and transmits a Create Session Response message to the S-GW in response to the Create Session Request message.

The Create Session Response message includes the IMSI of the UE, the EPS bearer ID, the S5 P-GW TEID, the subscribed QoS profile, the PDN type, the IP address (i.e., PDN address) allocated to the UE, etc.

If the P-GW selects a different PDN type from the requested PDN type, the P-GW indicates the PDN type and the cause of modification of the PDN type to the UE.

When this procedure is finished, generation of the S5 bearer between the S-GW and the P-GW is completed and thus the S-GW may transmit uplink traffic to the P-GW or receive downlink traffic from the P-GW.

6. The S-GW allocates an S1 S-GW TEID in order to generate an S1 bearer and transmits a Create Session Response message to the MME in response to the Create Session Request message.

The Create Session Response message includes the IMSI of the UE, the EPS bearer ID, the S1 S-GW TEID, the PDN type, the IP address (i.e., PDN address) allocated to the UE, etc.

7. The MME transmits a PDN Connectivity Accept message to the UE in response to the PDN connectivity request message.

The PDN Connectivity Accept message includes the EPS bearer ID, the APN, the IP address (i.e., PDN address) of the UE allocated by the P-GW, the PDN type, etc.

The PDN Connectivity Accept message is included in a bearer setup request message and delivered to an eNB in S1 signaling connection.

When this procedure is finished, generation of an uplink S1 bearer between the eNB and the S-GW is completed and the eNB may transmit uplink traffic to the S-GW.

8. The PDN Connectivity Accept message is included in an RRC connection reconfiguration message and delivered from the eNB to the UE in RRC connection.

When this procedure is finished, generation of DRB between the UE and the eNB is completed and the UE may transmit uplink traffic to the eNB or receive downlink traffic from the eNB.

9. The UE transmits an RRC Connection Reconfiguration Complete message to the eNB.

10. The eNB transmits a bearer setup response message to the MME.

The bearer setup response message includes an S1 eNB TEID and the like.

11-12. The UE transmits a PDN Connectivity Complete message including the EPS bearer ID to the MME.

When this procedure is finished, generation of an uplink default EPS bearer between the UE and the P-GW is completed and the UE may transmit uplink data to the P-GW.

13. The MME delivers the S1 eNB TEID received from the eNB to the S-GW through a Modify Bearer Request message.

When this procedure is finished, generation of a downlink S1 bearer between the eNB and the S-GW is completed and the eNB may receive downlink traffic from the S-GW.

13a-13b. The bearer between the S-GW and the P-GW is updated as necessary.

14. The S-GW transmits a Modify Bearer Response message to the MME in response to the Modify Bearer Request message.

When this procedure is finished, generation of a downlink default EPS bearer between the UE and the P-GW is completed and thus the P-GW may transmit downlink data to the UE. That is, connection between the UE and the PDN is established, and the UE may be provided with a PDN service using the allocated IP address.

15. The MME transmits a Notify Request message including a P-GW ID (i.e., P-GW address) and APN to the HSS as necessary.

16. The HSS stores the P-GW ID (i.e., P-GW address) and associated APN and transmits a Notify Response message to the MME.

Power Saving Mode

A power saving mode (PSM), one of 3GPP rel-12 enhancements for MTC features, is a function of defining a period in which a UE disables all access stratum (AC) operations such as paging reception and mobility management to minimize power consumption of the UE. That is, a UE supporting the PSM agrees on an active time and a periodic TAU (P-TAU) timer with a network or receives the same from the network during attach and tracking area update procedures.

When an active time value is received from the network, the UE maintains an ECM-IDLE state for the corresponding active time to receive paging upon switching from an ECM-CONNECTED state to the ECM-IDLE state. When the active time expires, the UE enters the PSM and stops all AS operations.

In addition, the MME starts the active timer with the active time value whenever the UE enters the ECM-IDLE mode. When the active timer expires, the MME deduces that the UE is unreachable.

That is, the active time refers to a time for which a UE that supports a state (e.g., power saving mode (PSM)) using a power saving function maintains an ECM-IDLE (or RRC_IDLE) state.

When the periodic TAU timer expires, the UE enables AS operations and performs TAU and the network stops an implicit detach timer of the corresponding UE. The UE may wake up whenever the UE wants for a mobile originated call (e.g., uplink data packet transfer).

On the other hand, for a mobile terminated call (e.g., downlink data packet receiving), the UE wakes up every P-TAU period to perform TAU, performs a paging receiving operation for a received active time, and then enters the PSM mode to sleep.

DRX (Discontinuous Reception) Mode

In the 3GPP LTE/LTE-A system, an EPS connection management (ECM)-CONNECTED state and an ECM-IDLE state are defined in order to manage signaling connection between a UE and a network. The ECM-CONNECTED state and ECM-IDLE state may also be applied to UEs and an MME. ECM connection includes RRC connection established between a UE and an eNB and S1 signaling connection established between an eNB and an MME. RRC state indicates whether an RRC layer of a UE is logically connected to an RRC layer of an eNB. That is, when the RRC layer of the UE is connected to the RRC layer of the eNB, the UE is in an RRC_CONNECTED state. When the RRC layer of the UE is not connected to the RRC layer of the eNB, the UE is in an RRC_IDLE state.

Here, the RRC_CONNECTED state in which a UE is connected to a specific cell refers to a state in which the UE can be provided with services per cell and the UE is managed per cell.

The RRC_IDLE state is a state in which a UE is not connected to an eNB and maintains only connection with a mobility management entity (MME), and the UE is managed per tracking area (TA) larger than a cell. That is, a UE in the RRC_IDLE state intermittently wakes up to monitor a paging channel (PCH) in order to check there is a paging message transmitted thereto. That is, the UE performs discontinuous reception (DRX) set by a NAS (non-access stratum) using an ID uniquely allocated in a tracking area. The UE may receive broadcast of system information and paging information by monitoring a paging signal at a specific paging time per UE-specific paging DRX cycle. Further, if the identifier of the UE is included in a paging channel when the UE checks whether a terminated call is arrived, the UE switches to the RRC_CONNECTED mode through a service request procedure. According to such network state definition, a UE having no activated service can minimize power consumption thereof and an eNB can efficiently use resources.

As described above, a UE needs to switch to an ECM connected state to be provided with a conventional mobile communication service such as audio or data. The UE in an initial stage such as a case in which power of the UE is initially turned on is in the ECM-IDLE state, and when the UE successfully registers with the corresponding network through an initial attach procedure, the UE and the MME make a transition to the ECM connected state. Further, when the UE is registered with the network but traffic is disabled and thus radio resources is not allocated thereto, the UE is in the ECM-IDLE state, and when new uplink or downlink traffic is generated for the UE, the UE and the MME make a transition to the ECM connected state through a service request procedure.

The 3GPP LTE/LTE-A system uses a UE discontinuous reception (DRX) technique in order to minimize power of UEs.

DRX defined in the 3GPP LTE/LTE-A system may be used in both UE idle mode and RRC_IDLE state.

A UE may perform PDCCH monitoring on the basis of an RNTI (e.g., C-RNTI, SI-RNTI, P-RNTI, etc.) which is a unique identifier of the UE.

PDCCH monitoring may be controlled by DRX operation and parameters with respect to DRX are transmitted from an eNB to the UE through an RRC message. If the DRX parameters are configured in the RRC connected state of the UE, the UE performs discontinuous monitoring for a PDCCH on the basis of DRX operation. On the other hand, if the DRX parameters are not configured, the UE performs continuous PDCCH monitoring.

Furthermore, the UE which has received a paging message as described above may perform DRX for the purpose of reducing power consumption.

To this end, the network configures a plurality of paging occasions for each time period called a paging cycle, and a specific UE receives a paging channel in a specific paging occasion and does not receive a paging channel in time other than the specific paging occasion. In addition, a single paging occasion may correspond to a single TTI.

Extended idle mode DRX (eDRX: extended DRX) is a function for minimizing UE power consumption by lengthening the conventional paging DRX cycle of a maximum of 2.56 s to several minutes to tens of minutes. eDRX may be applied to the idle mode and the connected mode. Extended idle mode DRX applied to the connected mode is shorter than DRX of a maximum of 10.24 s applied to the idle mode.

In the case of a UE supporting the eDRX mode, an unreachable state of the UE may refer to a state in which the UE is unreachable according to paging (i.e., a DRX period in which the UE does not monitor a paging channel).

On the contrary, in the case of a UE supporting the eDRX mode, a reachable state of the UE may refer to a state in which the UE is immediately reachable according to the ECM-CONNECTED mode and/or paging (i.e., a period in which the UE monitors a paging channel).

In other words, eDRX has a DRX period longer than that of the normal DRX mode and thus may be determined to be temporarily unreachable even in an idle period. That is, data delivery is possible after a maximum of 2.56 seconds when normal DRX (2.56 seconds) is supported, whereas immediate data delivery is impossible because maximum delay is 10 minutes, which can be considered to be unreachable, when eDRX (e.g., 10 minutes) is applied.

To reduce power consumption of the UE, the UE and the network may negotiate use of the extended idle mode DRX through NAS signaling. A UE to which the extended idle mode DRX is applied may use mobile terminating data and/or a network originated procedure within a specific time delay depending on a DRX cycle value.

A UE (particularly, an application at the UE) which wants to use the extended idle mode DRX needs to specially control a UE terminating service or data delivery. Particularly, the UE needs to consider delay tolerance of UE terminating data. The network (particularly, an application at the network) may transmit UE terminating data, SMS or a device trigger and needs to know whether the extended idle mode DRX is prepared. UEs should request the extended idle mode DRX only when all expected UE terminating communications have delay tolerance.

To negotiate use of the extended idle mode DRX, the UE requests an extended idle mode DRX parameter during an attach procedure and a RAU/TAU procedure. An SGSN/MME may reject or accept the UE request for extended idle mode DRX. When the SGSN/MME accepts the extended idle mode DRX, the SGSN/MME may provide a value different from the extended idle mode DRX parameter requested by the UE on the basis of an operator policy. When the SGSN/MME accepts use of extended idle mode DRX, the UE applies extended idle mode DRX on the basis of the received extended idle mode DRX parameter. If the SGSN/MME rejects the request or the UE cannot receive the extended idle mode DRX parameter in a related acknowledgement message because the request is received by an SGSN/MME which do not support extended idle mode DRX, the UE applies conventional DRX.

When the UE requests both the power saving mode (PSM) (request for an active time and/or a periodic TAU timer) and extended idle mode DRX through NAS, the SGSN/MME may determine the following.

Enabling only the PSM (i.e., rejecting the request for extended idle mode DRX)

Enabling only extended idle mode DRX (i.e., rejecting the request for the active time)

Enabling both the PSM and extended idle mode DRX (i.e., providing the active time and the extended idle mode DRX parameter)

When one of the above three operations is determined and related parameters (i.e., the active time, P-TAU timer and/or extended idle mode DRX cycle value) are provided to the UE, the next attach or RAU/TAU procedure is started and used until one of the above three operations is newly determined. If both the extended idle mode DRX and PSM are enabled, the extended idle mode DRX cycle may be set to have a plurality of paging occasions while an active timer operates.

When a PSM active time provided by the UE is longer than the extended idle mode DRX cycle, the SGSN/MME may enable both the PSM and extended idle mode DRX. This may minimize power consumption of the UE during the active time.

Machine-Type Communication (MTC)

FIG. 9 is a diagram showing an architecture for machine-type communication (MTC) in a wireless communication system to which the present invention is applicable.

An end-to-end application between a UE used for MTC (or MTC UE) and an MTC application may use services provided by a 3GPP system and optional services provided to an MTC server. The 3GPP system may provide transport and communication services (including a 3GPP bearer service, IMS and SMS) including various types of optimization for facilitating MTC.

FIG. 9 shows connection of a UE used for MTC to a 3GPP network (UTRAN, E-UTRAN, GERAN, I-WLAN, etc.) through an Um/Uu/LTE-Uu interface. The architecture of FIG. 9 includes various MTC models (a direct model, an indirect model and a hybrid model).

First, entities shown in FIG. 9 will be described.

In FIG. 9, an application server is a server on a network in which an MTC application is executed. The above-described various technologies for realizing the MTC application can be applied to the MTC application server and detailed description thereof is omitted. In addition, the MTC application server in FIG. 9 may access an MTC server through a reference point API. Detailed description thereof is omitted. Alternatively, the MTC application server may be collocated with the MTC server.

The MTC server (e.g., SCS server in FIG. 9) is a server on a network which manages MTC UEs and may be connected to a 3GPP network to communicate with UEs used for MTC and PLMN nodes.

An MTC-interworking function (MTC-IWF) may administer interworking between the MTC server and an operator core network and may serve as a proxy of MTC operation. To support the MTC indirect or hybrid model, the MTC-IWF may relay or interpret a signaling protocol on a reference point Tsp to cause a PLMN to operate a specific function. The MTC-IWF may execute a function of authenticating the MTC server before the MTC server establishes communication with the 3GPP network, a function of authenticating a control plane request from the MTC server, various functions associated with trigger indication which will be described later, etc.

A short message service-service center (SMS-SC)/Internet protocol short message gateway (IP-SM-GW) may manage transmission and reception of short message service (SMS). The SMS-SC may relay, store and deliver short messages between a short message entity (SME) (entity transmitting or receiving short messages) and UEs. The IP-SM-GW may manage protocol interworking between IP based UEs and the SMS-SC.

A charging data function (CDF)/charging gateway function (CGF) may perform charging related operations.

An HLR/HSS may execute functions of storing subscriber information (IMSI and the like), routing information, configuration information, etc. and providing the information to the MTC-IWF.

An MSC/SGSN/MME may execute control functions such as mobility management, authentication and resource allocation for connection of UEs to a network. This may execute a function of receiving trigger indication from the MTC-IWF with respect to triggering which will be described later and processing the trigger indication into a message to be provided to MTC UEs.

A gateway GPRS support node (GGSN)/serving-gateway (S-GW)+packet date network-gateway (P-GW) may serve as a gateway which manages connection between a core network and an external network.

Table 2 shows major reference points in FIG. 9.

TABLE 2

| Reference point | Description |
| --- | --- |
| Tsms | Reference point used for an external entity of a 3GPP system to communicate with an MTC UE through SMS |
| Tsp | Reference point used for an external entity of a 3GPP system to communicate with the MTC-IWF with respect to control plane signaling |
| T4 | Reference point used by the MTC-IWF to route device trigger to an SMS-SC of an HPLMN |
| T5a | Reference point between the MTC-IWF and a serving SGSN |
| T5b | Reference point between the MTC-IWF and a serving MME |
| T5c | Reference point between the MTC-IWF and a serving MSC |
| S6m | Reference point used by the MTC-IWF to inquire about UE identification information (E.164 Mobile Station International Subscriber Directory Number (MSISDN), IMSI mapped to an external identifier, or the like) and collect UE reachability and configuration information |

In Table 2, one or more of the reference points T5a, T5b and T5c are referred to as T5.

Meantime, user plane communication with the MTC server in the case of the indirect and hybrid models and communication with the MTC application server in the case of the direct and hybrid models may be performed using a conventional protocol through reference points Gi and SGi.

Details related to the description of FIG. 9 may be incorporated by reference by referring to 3GPP TS 23.682 document.

FIG. 10 shows an architecture for service capability exposure in a wireless communication system to which the present invention is applicable.

The architecture for service capability exposure shown in FIG. 10 enables a 3GPP network to safely expose service and capability thereof provided by a 3GPP network interface to an external third party service provider.

A service capability exposure function (SCEF) is a core entity in a 3GPP architecture for service capability exposure which provides a means for safely exposing service and capability provided by the 3GPP network interface. In other words, the SCEF is a core entity for providing a service function, which belongs to the trust domain operated by a mobile carrier. The SCEF provides an API interface to a third party service provider and provides 3GPP service functions to the third party service provider through connection with various entities of 3GPP. The SCEF may be provided by an SCS.

When Tsp function can be exposed through an application program interface (API), the MTC-IWF may be collocated with the SCEF. A protocol (e.g., DIAMETER, RESTful APIs, XML over HTTP, etc.) for specifying a new 3GPP interface depending on multiple factors is selected. Here, the multiple factors include easiness of exposure of requested information or necessity for a specific interface but are not limited thereto.

The SCEF is an entity belonging to a trust domain and may be operated by a cellular operator or a trusted third party service provider. This is a node for exposing service architecture proceeding under a work item such as monitoring enhancement (MONTE), architecture enhancements for service capability exposure (AESE) of 3GPP Release 13 and performs management such as providing functions related to monitoring and charging to an external third party by being connected to 3GPP entities which will provide services as shown in FIG. 10 and configuring a communication pattern of a third party service provider in an EPS.

Efficient Small Data Transmission for Narrow Band Internet of Things (IOT)

Cellular Internet of Things (CIoT) is a definition of new wireless access suitable for IoT service, and two CIoT schemes are under discussion in 3GPP Release-12. One is a solution evolving from GERAN into CIoT and the other is a new wireless access network form suitable for narrow band (NB) radio access technology (RAT) called "clean slate".

An architecture with respect to a new core network for efficient small data transmission for supporting narrow band IoT is under discussion in 3GPP.

FIG. 11 is a diagram showing an end-to-end small data flow in a wireless communication system to which the present invention is applicable.

As shown in FIG. 11, non-IP data may be transmitted and received between an AS and a CIoT serving gateway node (C-SGN) through a point-to-point tunnel. The C-SGN is a node added to Rel-13 in order to support CIoT UEs.

Further, an SCEF framework may be used to transmit/receive non-IP packets. In other words, non-IP data may be transmitted and received between an AS/SCS and the C-SGN through the SCEF.

In addition, non-IP data may be transmitted and received between the C-SGN and a UE through an S1-MME reference point. That is, encrypted small data (e.g., non-IP data) may be transmitted and received between the UE and the C-SGN in the NAS.

The C-SGN is a new logical entity and may be realized to support only essential functions required for the following CIoT use cases.

Some procedures required in a mobility management (MM) procedure

Efficient small data procedure

Security procedure required for efficient small data

SMS on PS domain using a non-combined GPRS attach procedure when short message service (SMS) support is required Paging optimization for coverage enhancement Termination of SGi interface for non-roaming cases S8 interface support for roaming cases Supporting attach (i.e., attach for only for SMS transmission and reception without PDN connectivity for IP (or non-IP)) procedure for only SMS Supporting tunneling on SGi for non-IP data In addition, the following solution for small data (e.g., non-IP data) transmission using the SCEF is under discussion.

Solution) Non-IP small data transmission through the SCEF which minimizes a load applied to HSS FIG. 12 shows a cellular IoT network architecture proposed for efficient non-IP small data transmission through the SCEF in a wireless communication system to which the present invention is applicable.

T6a is a reference point used between the SCEF and a serving MME and T6b is a reference point used between the SCEF and a serving SGSN. T6a/T6b satisfy the following requirements.

T6a connects the SCEF to the serving MME.

T6b connects the SCEF to the serving SGSN.

Functions such as configuring a monitoring event in the serving MME/SGSN by the SCEF and reporting a monitoring event to the SCEF by the serving MME/SGSN are supported.

Non-IP data delivery (NIDD) from the serving MME/SGSN

S6t is a reference point used between the SCEF and an HSS and satisfies the following requirements.

The SCEF is connected to the HSS including subscription and UE related information.

Monitoring event configuration/deletion in the HSS by SCEF

Monitoring event report to the SCEF by the HSS

Configuration/deletion of communication pattern parameters by the SCEF for the HSS First, a monitoring event configuration procedure will be described.

A monitoring event of small data transmission (SDT) may be configured as follows.

Prior to mobile originated (M)) and mobile terminated (MT) small data transmission, the MME/C-SGN and the SCEF acquire information (SCEF ID and MME/C-SGN routing information) necessary for MO and MT small data transmission through a monitoring event configuration procedure.

FIG. 13 shows a monitoring event configuration and deletion procedure through the HSS in a wireless communication system to which the present invention is applicable.

1. An SCS/AS transmits a monitoring request message (external identifier(s)) or mobile station integrated system digital networks (MSISDN), an SCS/AS identifier, an SCS/AS reference ID, a monitoring type, a maximum number of reports, a monitoring duration, a monitoring destination address and an SCS/AS reference ID for deletion) to the SCEF.

Here, the SCS/AS may set the monitoring type to "SDT".

2. The SCEF stores the SCS/AS reference ID, SCS/AS identifier, monitoring destination address, monitoring duration and maximum number of reports. The SCEF allocates the SCEF reference ID. If the SCS/AS is not authorized to perform this request, the monitoring request is malformed or the SCS/AS exceeds a quota or rate of monitoring request submission on the basis of an operator policy, the SCEF performs step 9 and provides an appropriate cause value indicating an error. If the SCEF receives the SCS/AS reference ID for deletion, the SCEF derives a related SCEF reference ID for deletion.

3. The SCEF transmits a monitoring request message (an external identifier or MSISDN, an SCEF ID, an SCEF reference ID, a monitoring type, a maximum number of reports, a monitoring duration, SCEF reference ID for deletion, and a chargeable party identifier) to the HSS in order to configure a given monitoring event in the HSS and MME/SGSN.

4. The HSS checks the monitoring request message. For example, the HSS checks whether the parameters included in the message are in a range acceptable by the operator with respect to the presence of the external identifier or MSISDN, whether monitoring events are supported by the serving MME/SGSN or whether a monitoring event to be deleted is valid. The HSS optionally authorizes a chargeable party identified by the chargeable party identifier. If the aforementioned checking fails, the HSS conforms to step 8 and provides a cause value indicating the cause of the failure state to the SCEF.

The HSS stores the SCEF reference ID, the SCEF ID, the maximum number of reports, the monitoring duration and the SCEF reference ID for deletion provided by the SCEF.

5. When a specific monitoring type is requested and the monitoring events are supported by the serving MME/SGSN, the HSS transmits an Insert Subscriber Data Request message (the monitoring type, the SCEF ID, the SCEF reference ID, the maximum number of reports, the monitoring duration, the SCEF reference ID for deletion and the chargeable party identifier) to the MME/SGSN.

6. The MME/SGSN verifies the request. For example, if the monitoring type is covered according to roaming agreement when the request is transmitted from another PLMN, whether the SCEF reference ID for deletion can be served and deleted is checked. When this check fails, the MME/SGSN conforms to step 7 and provides a cause value indicating the cause of the failure state to the SCEF. The MME/SGSN may reject the request for another cause (e.g., overload or whether the HSS exceeds the monitoring request submission quota or rate) on the basis of the operator policy.

The MME/SGSN stores received parameters and, when the request is a one-time request and a monitoring event is not available in the MME/SGSN on an Insert Subscriber Data Answer transmission occasion, starts to monitor the indicated monitoring event. The MME/SGSN deletes a monitoring configuration identified by the SCEF reference ID for deletion.

7. When the monitoring configuration has been successfully performed, the MME/SGSN transmits an Insert Subscriber Data Answer (cause) message to the HSS. If the requested monitoring event is available in the MME/SGSN on the Insert Subscriber Data Answer transmission occasion, the MME/SGSN includes a monitoring event report in the Insert Subscriber Data Answer message.

8. The HSS transmits a monitoring response message (the SCEF reference ID and cause) to the SCEF in order to acknowledge authentication of the monitoring request and deletion of the identified monitoring event configuration. The HSS deletes the monitoring event configuration identified by the SCEF reference ID. If the requested monitoring event is available for the HSS on the monitoring response message transmission occasion or the requested monitoring event is received from the MME/SGSN in step 7, the HSS includes a monitoring event report in the monitoring response message.

If the request is a one-time request and Insert Subscriber Data Answer includes the monitoring event report, the HSS deletes the related monitoring event configuration.

In the case of UE mobility, the HSS determines whether a new MME/SGSN supports the requested monitoring event.

Here, if the monitoring type received in step 3 is set to "SDT", the HSS may include routing information of the MME/C-SGN in the monitoring response message.

9. The SCEF transmits the monitoring response message (the SCS/AS reference ID and cause) to the SCS/AS in order to acknowledge authentication of the monitoring request and deletion of the identified monitoring event configuration. If the SCEF receives the monitoring event report, the SCEF includes the monitoring event report in the monitoring response message. If the request is a one-time request and the monitoring response includes the monitoring event report, the SCEF deletes the related monitoring event configuration.

Common parameters related to the monitoring event configuration procedure shown in FIG. 13 are as follows.

The SCS/AS reference ID is a parameter generated by the SCS/AS and indicates specific transaction initiated by the SCS/AS for the SCEF. The SCS/AS reference ID is stored in the SCEF.

The SCEF reference ID is generated by the SCEF to correlate a monitoring event report or monitoring event deletion with a specific monitoring request and related context information in the SCEF. The SCEF reference ID is stored in the HSS, the MME or the SGSN.

The SCEF ID indicates the SCEF to which a monitoring indication message needs to be transmitted by the HSS, the MME or the SGSN. The SCEF ID is stored in the HSS, the MME or the SGSN.

The monitoring type identifies a requested specific monitoring event.

The maximum number of reports is an optional parameter and indicates a maximum number of event reports generated by the HSS, the MME or the SGSN until an associated monitoring event is considered to expire.

The monitoring duration is an optional parameter and indicates an absolute time when an associated monitoring event request is considered to expire.

Inclusion of the maximum number of repeats (having a value greater than 1) or the monitoring duration indicates that a monitoring request is continuous monitoring requests. In continuous monitoring requests, a single monitoring request may generate a plurality of monitoring indication messages.

Non-existence of the maximum number of reports and the monitoring duration indicates that a monitoring request is a one-time monitoring request. In one-time monitoring requests, a single monitoring request generates a single monitoring report.

When both the maximum number of reports and the monitoring duration are included in a given monitoring event, a monitoring request is considered to expire when a single condition is satisfied.

The monitoring destination address is an optional parameter included by the SCS/AS in order to indicate delivery of monitoring indications to a different address from a requested SCS/AS address. Non-existence of this parameter indicates that monitoring indications are delivered to the SCS/AS in which a monitoring request is generated.

The SCS/AS reference ID for deletion identifies a monitoring event configuration which needs to be deleted before a requested monitoring event configuration is applied.

The SCEF reference ID for deletion identifies a monitoring event configuration which needs to be deleted before a requested monitoring event configuration is applied.

The chargeable party identifier is an optional parameter included by the SCEF. This parameter identifies an entity for which accounting/charging functions are executed by an associated 3GPP network element.

Hereinafter, an MO small data (i.e., IP, non-IP, SMS) transmission procedure will be described.

FIG. 14 shows an MO small data transmission procedure in a wireless communication system to which the present invention is applicable.

1a. A monitoring event is detected by a node (i.e., MME/C-SGN) for which the monitoring event is configured.

That is, the MME/C-SGN may detect the monitoring event by receiving MO small data.

More specifically, a UE may send a request for establishment of RRC connection to the AS of the UE. A new NAS message format which carries small data packets in an encrypted information element (IE) may be used. Here, unencrypted part of this new NAS PDU may carry "eKSI and sequence number" IE. The MME/C-SGN may use "eKSI and sequence number" IE and SAE-temporary mobile subscriber identity (S-TMSI) to identify a security context for decrypting small data packets. A RAN may deliver a NAS PDU to the MME/C-SGN. The MME/C-SGN may decrypt a NAS message and obtain small data packets.

2a. The node (i.e., MME/C-SGN) transmits a monitoring indication message (an SCEF reference ID and a monitoring event report) to the SCEF. If a monitoring event configuration is triggered by a one-time monitoring request, the monitoring event configuration is deleted by the MME/SGSN when this step is finished. If the MME/SGSN has a maximum number of reports stored for this monitoring task, the MME/SGSN decreases the value by 1.

Here, the monitoring event report may include MO small data. The SCEF may respond to the MME/C-SGN using an acknowledgement message.

3. The SCEF retrieves a related SCS/AS reference ID along with a monitoring destination address or an SCS/AS address as a destination to which the monitoring indication message will be transmitted using the SCEF reference ID. The SCEF transmits the monitoring indication message (SCS/AS reference ID, external ID or MSISDN and monitoring information) to the identified destination.

When the maximum number of reports is reached for a continuous monitoring request, the SCEF sends a request for deletion of the related monitoring event configuration and the associated monitoring event configuration according to steps 3 to 8 of the procedure of FIG. 13 to an HSS (in the case of a monitoring event configured through the HSS) or MME(s)/SGSN(s) (in the case of a monitoring event directly configured in the MME/SGSN).

When a report about a one-time monitoring request set through the HSS is received from the MME/SGSN (step 2a), the SCEF sends a request for deletion of the related monitoring event configuration and the associated monitoring event configuration according to steps 3 to 8 of the procedure of FIG. 13 to the HSS.

Here, the SCEF may transmit MO small data to a monitoring destination node through a monitoring report procedure.

Hereinafter, an MT small data (i.e., IP data, non-IP data and SMS) transmission procedure will be described.

FIG. 15 shows an MT small data transmission procedure in a wireless communication system to which the present invention is applicable.

1. An SCS/AS transmits a small data transmission (SDT) request message (an SCS/AS reference ID for SDT and MT small data) to the SCEF.

2. If the SCEF does not have routing information which is valid for an MME/C-SGSN corresponding to the SCS/AS reference ID for SDT, the SCEF queries an HSS.

3. The SCEF transmits the SDT request message (SCS/AS reference ID for SDT, and MT small data) to the MME/C-SGN.

The MME/C-SGN may transmit the MT small data to a UE.

More specifically, the MME/C-SGN may receive small data packets from the SCEF. If there is no signaling connection to the UE, the MME/C-SGN may buffer the received small data packets and transmit paging to the UE. The UE may transmit a service request message to the MME/C-SGN as a response to the paging. Then, the C-SGN may transmit the small data packets in an encrypted IE in a NAS PDU in a downlink NAS message, and an RAN may transmit the NAS PDU to the UE.

4. The MME/C-SGN transmits an SDT response message (an SCEF reference ID for SDT, and cause) to the SCEF.

If a valid context related to the SCEF reference ID for SDT is not present in the MME/C-SGN, the MME/C-SGN notifies the SCEF of MT small data transmission failure by setting the cause to an appropriate value. In this case, the SCEF may perform the procedure from step 2 again.

5. The SCEF transmits the SDT response message (SCS/AS reference ID for SDT, and cause) to the SCS/AS.

Non-IP Data Delivery (NIDD)

Functions for NIDD may be used for UEs to process mobile originated (MO) and mobile terminated (MT) communication. Here, packets used for communication may be regarded as unstructurized from an ESP standpoint. That is, these packets may be called non-Internet protocol (non-IP) packets (or data). That is, a non-IP packet may refer to a packet which does not include a source IP address and a destination IP address in the header thereof and may be understood as the same concept as small data in the present description. Support of non-IP data is part of CIoT EPS optimization. Non-IP data delivery to an SCS/AS may be performed using one of the following two mechanisms.

Delivery using the SCEF

Delivery using a point-to-point (PtP) SGi tunnel

NIDD via the SCEF is processed using PDN connection to the SCEF. A UE may acquire non-IP PDN connection to the SCEF during an attach procedure or UE requested PDN connectivity or PDP context activation procedure.

The UE cannot recognize whether non-IP PDN connection is provided via the SCEF or a PGW.

Association between the SCS/AS and the SCEF needs to be established such that non-IP data delivery can be performed between the UE and the SCS/AS.

NIDD via the SCEF uses user identity in order to identify a UE to which specific T6a/T6b connection belongs. User identity is one of user IMSI, MSISDN and an external identifier. The user IMSI is not used for an interface between the SCEF and the SCS/AS.

To perform NIDD or transmit or receive NIDD data, the SCS/AS uses the MSISDN or the external identifier to identify the user. To enable correlation of the SCS/AS which requests T6a/T6b for a given UE, the HSS provides the user IMSI to the SCEF and, if possible, provides the MSISDN information (when an NIDD configuration request includes the external identifier) or the external identifier (when the NIDD configuration request includes the MSISDN).

The SCEF may buffer MO and/or MT non-IP data according to operator policy.

Protocol configuration options (PCO) may be used to deliver parameters (e.g., a maximum packet size and the like) between the UE and the SCEF. Information of the PCO may be transparently delivered through the MME/SGSN. The PCO is transmitted in EPS session management signaling between the UE and the MME and transmitted in GPRS session management signaling between the UE and the SGSN.

Hereinafter, a link setup process for UL/DL data (i.e., non-IP data) transmission through the MME/SGSN and SCEF will be described.

FIG. 16 shows a link setup process for UL/DL data (i.e., non-IP data) transmission through the MME and SCEF in a wireless communication system to which the present invention is applicable.

Since an IP protocol is not used for transmission and reception of non-IP data, the data may be transmitted and received using a P2P method. To apply this method to networks, a link (i.e., PDN connection for non-IP data transmission and reception) may be set up in advance between a UE and a PDN (i.e., an access point name (APN)) via the MME and the SCEF.

Here, the APN refers to a PDN identifier (i.e., PDN ID) and represents a character string for indicating or identifying the PDN. A P-GW that needs to be used by the UE may be determined using the APN. Further, a tunnel through which the UE is connected to the PDN may be defined using the APN. Each PDN may have an APN for identifying the corresponding PDN and one or more P-GWs associated with the corresponding PDN.

1) First, an NIDD configuration procedure is performed.

Connection setup between SCS/AS and the SCEF may be referred to as NIDD configuration. This may be regarded as prior to T6a connection setup. That is, the NIDD configuration procedure may be performed before a third party service provider contracts with an operator for IoT business and IoT UEs are deployed and registered with the network.

The SCS/AS requests setup from the SCEF for a UE which wants connection setup using the MSISDN or external identity of the UE. Then, the SCEF requests authentication handling of the UE and the SCS/AC and UE ID resolution from the HSS. That is, IMSI is a UE identifier that cannot be exposed to an external network (i.e., SCS/AS), and thus the external network can identify the UE using an MSISDN (i.e. UE number) or an external identifier, in general, as described above. Information on mapping between ID and IMSI is stored in the HSS. When the NIDD configuration procedure is successfully completed, NIDD configuration is completed and a context with respect to the corresponding UE is generated in the SCEF.

Here, the NIDD configuration procedure is performed through an API interface.

The NIDD configuration procedure will be described in more detail with reference to FIG. 17.

2a) The UE transmits a PDN connection request message to the MME.

The UE transmits APN information along with a non-IP type indication to the MME while requesting PDN connection setup (i.e., transmitting the PDN connection request message). Then, the MME checks subscription information corresponding to the APN through the HSS and determines whether PDN connection setup using the SCEF is performed.

2b) A T6a connection establishment procedure is performed.

If invoke SCEF selection is enabled as shown in Table 3, the MME starts setup of T6a connection to the SCEF. A destination SCEF used in this case may also use subscription information of the UE, which is stored in the HSS.

As described above, the UE requests PDN connection from the MME when the UE wants attachment or services. The MME determines whether T6a connection is established with reference to the subscription information of the UE when requested PDN connection is non-IP type (i.e., PDN type is "non-IP").

The T6a connection establishment procedure will be described in more detail with reference to FIG. 18.

Table 3 shows information stored in the HSS for SCEF connection.

TABLE 3

| Field | Example |
|---|---|
| PDN address) | N/A |
| PDN type | Non-IP |
| Access point name (APN) | www.3rdparty-service.com |
| Invoke SCEF selection | Yes |
| SCEF ID | xxx.xxx.xxx |

FIG. 17 shows an NIDD configuration procedure in a wireless communication system to which the present invention is applicable.

1. The SCS/AS transmits an NIDD configuration request message (external identifier or MSISDN, SCS/AS identifier, SCS/AS Reference ID, NIDD duration, NIDD destination address and SCS/AS reference ID for deletion) to the SCEF.

2. The SCEF stores the external identifier or MSISDN, SCS/AS reference ID, SCS/AS identifier, NIDD destination address and NIDD duration. When the SCS/AS is not authorized to perform this request or the NIDD configuration request is malformed, the SCEF performs step 6 and provides a cause value indicating an error. The SCEF may change the NIDD duration according to configuration.

3. The SCEF transmits an NIDD authorization request message (external Identifier or MSISDN and APN) to the HSS in order to authorize the NIDD configuration request with respect to the received external identifier or MSISDN and to receive information necessary for NIDD.

4. The HSS checks the NIDD authorization request message (with respect to existence of the external identifier or MSISDN or mapping between the external identifier and IMSI and/or MSISDN). When checking fails, the HSS conforms to step 5 and provides a result indicating the cause of the failure state to the SCEF.

5. The HSS transmits an NIDD authorization response message (IMSI, MSISDN or external identifier, and result) to the SCEF in order to acknowledge authentication of the NIDD authorization request. The IMSI, and if possible, the MSISDN (when the NIDD configuration request includes the external identifier) or external identifier(s) (when the NIDD configuration request includes the MSISDN) are returned by the HSS in this message. This authorizes the SCEF to correlate T6a/T6b connection (refer to FIG. 18 below) established for the corresponding user with the SCS/AS request received in step 1 of this procedure.

6. The SCEF transmits an NIDD configuration response message (SCS/AS reference ID and cause) to the SCS/AS in order to acknowledge authentication of the NIDD configuration request and deletion of the identified NIDD configuration.

FIG. 18 shows a T6a connection establishment procedure in a wireless communication system to which the present invention is applicable.

When a UE performs an EPS attach procedure involving a PDN type of "non-IP" (refer to FIG. 7) and subscription information corresponding to a default APN for the PDN type of "non-IP" or an APN requested by the UE includes an "Invoke SCEF Selection" indicator, the MME starts T6a/T6b connection to the SCEF corresponding to an "SCEF ID" indicator for the corresponding APN.

1. The UE performs steps 1 to 11 of the UTRAN initial attach procedure (refer to 7) or step 1 of the UE requested PDN connectivity procedure (refer to FIG. 8).

The MME receives subscription information and SCEF ID for non-IP PDN connection to the APN correlated with the "Invoke SCEF Selection" indicator.

If MSISDN is correlated with subscription of the user, MSISDN is provided by the HSS to the MME as user identity.

2. When the subscription information corresponding to the default APN for "non-IP" PDN type or the UE requested APN includes the "Invoke SCEF Selection" indicator, the MME generates PDN connection to the SCEF and allocates EPS bearer identity to the PDN connection, instead of steps 12 to 16 of the UTRAN initial attach procedure (refer to FIG. 7) or steps 2 to 6 of the UE requested PDN connectivity procedure (refer to FIG. 8). Here, an EPS bearer is a transmission path of traffic generated between a UE and a PDN GW in order to deliver user traffic in the EPS, and EBI is an identifier for identifying the EPS bearer.

This is performed by transmitting, by the MME, a Create SCEF Connection Request message (user identity, EBI, SCEF ID, APN and APN Rate Control, Serving PLMN Rate Control, number of PDN connections and PCO) to the SCEF.

When an IWK-SCEF (here, the IWK-SCEF corresponds to a node used during roaming) receives the Create SCEF Connection Request message from the MME, the IWK-SCEF delivers the message to the SCEF.

The SCEF may uniquely identify PDN connection thereto for the given UE by combining the EBI, APN and user identity.

If the SCS/AS and the SCEF perform the NICC configuration procedure for the user identity received in step 2, step 3 is performed. If the SCS/AS does not perform the NIDD configuration procedure for the user identity received in step 2, the SCEF rejects T6a connection setup or starts an NIDD configuration procedure set in the SCEF along with the SCEF using implementation of a specific procedure.

If NIDD is not configured, T6a connection instead of end-to-end connection may be rejected even if T6a connection is established or NIDD configuration may be triggered according to implementation.

3. The SCEF generates a SCEF EPS bearer context for the UE identified through the user identity and EBI. The SCEF transmits a Create SCEF Connection Response message (user identity, EBI, SCEF ID, APN, PCO and NIDD charging ID) for confirming establishment of PDN connection to the SCEF for the UE to the MME.

When the IWK-SCEF receives the Create SCEF Connection Response message from the SCEF, the IWK-SCEF delivers the message to the MME.

Upon completion of the procedures of FIGS. 17 and 18, a context is generated in the SCEF for the corresponding UE and non-IP PDN connection through the SCEF is generated.

Next, a downlink PDN connected data transmission procedure through the SCEF.

FIG. 19 shows a mobile terminated NIDD procedure in a wireless communication system to which the present invention is applicable.

FIG. 19 shows a procedure used for an SCS/AS to transmit non-IP data to a user identified through an external identifier or MSISDN. This procedure is based on the assumption that the procedure of FIG. 18 is completed.

1. When NIDD service has been enabled for a given UE and the SCS/AS has non-IP data to be transmitted to the UE, the SCS/AS transmits an NIDD Submit Request message (an external identifier or MSISDN, an SCS/AS reference ID and non-IP data) to the SCEF.

Here, the SCS/AS reference ID corresponds to a value provided by the SCS/AC when NIDD is configured and is also received when an NIDD configuration response is received from the SCEF. In addition, the SCS/AS use the SCS/AS reference ID for data transmission.

2. When an SCEF EPS bearer context corresponding to the external identifier or MSISDN included in step 1 is discovered, the SCEF checks whether the SCS/AS has been authorized to transmit an NIDD request and whether the SCS has not exceeded the quota (e.g., 200 bytes within 24 hours) or rate (e.g., 10 bytes per hour) of data submission thereof.

When this check fails, the SCEF transmits an NIDD response including a cause value indicating the cause of the failure state and stops the operation in this step. Otherwise, the procedure proceeds to step 3.

When the SCEF EPS bearer context is not discovered, the SCEF may perform any one of the following operations according to configuration.

An operation of transmitting an NIDD response including an appropriate error cause value and stopping the operation in this step.

An operation of performing device triggering for the UE in order to establish non-IP PDN connection to the SCEF. In this case, step 6 is performed with an appropriate cause value.

An operation of accepting the NIDD Submit Request is accepted, performing step 6 with an appropriate cause value, and waiting for the UE to perform a procedure of causing establishment of PDN connection to the SCEF.

3. When the SCEF EPS bearer context corresponding to the external identifier or MSISDN included in step 1 is discovered, the SCEF transmits an NIDD Submit Request message (user identity, an EBI, an SCEF ID and non-IP data) to an MME.

When an IWK-SCEF receives the NIDD Submit Request message from the SCEF, the IWK-SCEF relays the message to the MME.

4. When the MME can immediately deliver the non-IP data to the UE (e.g., the UE is in an ECM_CONNECTED mode or the UE is in an ECM_IDLE mode and the MME can state a paging procedure), a non-IP data delivery procedure is performed in step 8.

If the MME knows that the UE is unreachable when the UE uses a power saving function (e.g., PSM mode or eDRX), the MME transmits an NIDD Submit Response message (causes and reachable for NIDD) to the SCEF. The cause parameter indicates that the non-IP data has not been delivered to the UE. The reachable for NIDD flag indicates that the MME will notify the SCEF that the UE is reachable when the MME determines that the UE is reachable. The MME stores the reachable for NIDD flag in an EMM context for the UE.

5. The SCEF may transmit an NIDD response to the SCS/AS which notifies the SCEF of the result received from the MME. When the SCEF receives the reachable for NIDD flag from the MME, the SCEF may buffer the non-IP data requested in step 3 on the basis of configuration.

6. When the MME detects that the UE is reachable (e.g., when the UE exits a PSM mode by performing TAU or starts MO communication), the UE becomes reachable (e.g., an eDRX cycle expires, an MO communication pattern of the UE predicted by the MME, etc.), and the MME can reach an NIDD flag set, the MME transmits an NIDD Submit Indication message (user identity) to the SCEF. The MME clears the reachable for NIDD flag from the EMM context.

7. The SCEF transmits the NIDD Submit Request message (user identity, EBI, SCEF ID and non-IP data) to the MME.

8. If required, the MME pages the UE and delivers the non-IP data to the UE using a data delivery procedure through the MME.

9. When the MME can start step 8, the MME transmits an NIDD Submit Response Cause message to the SCEF as acknowledgement for the NIDD Submit Request message received from the SCEF in step 3 or 7. The SCEF confirms non-IP data delivery to the SCS/AS.

Serving Node Relocating Method

The present invention proposes a method of processing change (or relocation) of a serving node (e.g., MME/SGSN or C-SGN) in the above-described method (refer to FIGS. 14 and 15) of transmitting non-IP small data (i.e., small data or non-IP data) via the SCEF.

In the present description, small data may be interpreted as non-IP data.

For example, when non-IP data is transmitted as shown in FIG. 15, if a serving node (e.g., MME/SGSN or C-SGN) is changed due to UE handover and the SCEF transmits non-IP data to the serving node because the SCEF does not recognize the UE handover (step 3 in FIG. 15), a previous MME transmits a response message including a cause value indicating an error to the SCEF. Accordingly, the SCEF may perform an inefficient operation of inquiring an HSS about the location of the serving node (i.e., routing information) and then transmitting the non-IP data to a new serving node.

Therefore, the present invention proposes a method by which the SCEF can be aware of correct information of the serving node in this case.

In addition, the present invention proposes a method by which an SCS/AS successfully transmits non-IP data to a UE even when a serving node of the UE changes when a UE reachability monitoring event is used.

Particularly, the present invention proposes a method by which the SCEF recognizes the serving node (e.g., MME/SGSN or C-SGN) of the UE such that the SCEF can transmit data to the serving node without querying to the HSS about the information of the serving node every time when the SCS/AS intends to transmit data (e.g., non-IP data) to the UE via the SCEF.

When the serving node (e.g., MME/SGSN or C-SGN) detects change of the serving node of the UE during a tracking area update/routing area update procedure (i.e., when the serving node which has received a TAU request message or an RAU request message is different from the old node), and connection for transmission/reception of non-IP data via the service capability exposure function (SCEF) is configured for the UE, the serving node notifies the SCEF of change of the serving node.

Here, a case in which the type of PDN connection currently configured for the UE through the procedure of FIG. 18 is "non-IP" and the PDN connection is established via the SCEF may correspond to an example of the case in which connection for transmission/reception of non-IP data via the SCEF is configured for the UE. In this case, whether the PDN connection is established via the SCEF may be determined based on whether the Invoke SCEF Selection indicator is included (i.e., set) as shown in Table 3 prior to subscription information corresponding to an APN about the PDN connection.

Alternatively, a case in which a small data transmission event or a monitoring event for SDT is configured in the serving node may correspond to an example of the case in which connection for transmission/reception of non-IP data via the SCEF is configured for the UE. That is, when an SDT event or a monitoring event for SDT is configured in the serving node according to the procedure of FIG. 13, the serving node may notify the SCEF of change of the serving node when the serving node is changed.

Alternatively, a case in which an SDT monitoring event is configured and routing information update is configured for the SCEF with respect to serving node change may correspond to an example of the case in which connection for transmission/reception of non-IP data via the SCEF is configured for the UE. That is, referring to FIG. 13, the SCS/AS may include information indicating reporting of serving node change in the monitoring request message and transmit the monitoring request message including the indication information to the SCEF in step 1. In addition, the SCEF may include information indicating reporting of serving node change in the monitoring request message and transmit the monitoring request message including the indication information to the HSS in step 3. Further, the HSS may include information indicating reporting of serving node change in the Insert Subscriber Data Request message and transmit the message including the indication information to the serving node in step 5. Upon reception of the indication information, the serving node may notify the SCEF of change of the serving node when the serving node is changed.

Hereinafter, a method of reporting change of a serving node to the SCEF will be described.

FIG. 20 shows a tracking area update procedure in a wireless communication system to which the present invention is applicable.

The TAU procedure may be performed when UE entry into a new tracking area (TA) which is not included in a tracking area identity (TAI) list registered with a network is detected, a periodic TAU timer expires, or temporary identity used in next update (TIN) indicates packet-temporary mobile subscriber identity (P-TMSI) when a UE reselects E-UTRAN.

FIG. 20 illustrates a case of an inter-MME TAU procedure.

1-3. When a TAU timer of a UE in an ECM-IDLE state expires or the UE moves to another tracking area, a TAU procedure for reporting a tracking area (TA) to an MME is triggered.

The UE starts the TAU procedure by transmitting a TAU request message to the MME.

The TAU request message is included in an RRC Connection Setup Complete message and delivered in RRC connection, and included in an initial UE message and delivered in S1 signaling connection.

When the UE needs to use eDRX, the UE includes eDRX parameter information in the TAU request message even when eDRX parameters have been negotiated.

4. When the MME which has received the TAU request message differs from the old node (i.e., MME or SGSN) (i.e., when the MME has been changed), a new MME transmits a context request message to the old MME/SGSN in order to acquire user information (or UE context) from the old MME/SGSN.

5. When the context request message is transmitted to the old MME/SGSN, the old MME/SGSN responds to the context request message using a context response message. The context response message may include UE context.

6. The UE, the new MME and an HSS perform an authentication function and a security (or ciphering) procedure.

The new MME determines whether to relocate an S-GW. When the old S-GW cannot provide a service to the UE any more, the S-GW is relocated. In addition, the new MME may determine relocation of the S-GW when a new S-GW is expected to provide the service to the UE for a longer time and/or a P-GW path is expected to be more suitable for the UE or the new S-GW is collocated with a P-GW.

7. When the MME selects a new S-GW, the MME transmits a Create Session Request message to the selected new S-GW for each PDN connection.

8. The new S-GW transmits a Modify Bearer Request message to the P-GW for each PDN connection as necessary.

9a. The P-GW may perform an IP connectivity access network (IP-CAN) session modification procedure with a PCRF as necessary.

9. Upon reception of the Modify Bearer Request message from the new S-GW, the P-GW transmits a Modify Bearer Response message to the new S-GW in response to the Modify Bearer Request message.

10. The new S-GW updates the bearer context thereof. Accordingly, the new S-GW may route a bearer PDU to the P-GW when receiving the bearer PDU from an eNB.

The new S-GW transmits a Create Session Response message to the new MME in response to the Create Session Request message.

11. The new MME transmits a Context Acknowledge message to the old MME/SGSN.

When the MME selects a new S-GW, the MME delivers S-GW change indication information to the old MME/SGSN through the Context Acknowledge message. The S-GW change indication information indicates that the new S-GW has been selected.

12. The new MME transmits an Update Location Request message to the HSS.

Here, the new MME may check presence or absence of subscription information about the UE is present, and when the subscription information about the UE is not present, transmit the Update Location Request message to the HSS.

13. The HSS transmits a Cancel Location message to the old MME/SGSN.

14. The old MME/SGSN transmits a Cancel Location Acknowledge message to the HSS in response to the Cancel Location message.

15. When the old SGSN receives the Context Acknowledge message and the UE is connected through an Iu interface, the old SGSN transmits an Iu Release Command message to an RNC.

16. The RNC transmits an Iu Release Complete message to the old SGSN in response to the Iu Release Command message.

17. The HSS transmits an Update Location Acknowledge message to the new MME in response to the Update Location Request message.

The Update Location Acknowledge message may include the subscription information about the UE.

18. When S-GW change indication is received in the Context Acknowledge message of step 11, the old MME/SGSN cancels MME or SGSN EPS bearer resources by transmitting a Delete Session Request message to the old S-GW.

19. The old S-GW transmits a Delete Session Response message to the old MME/SGSN in response to the Delete Session Request message.

20. The new MME transmits a TAU Accept message to the UE. Here, when the new MME allocates new globally unique temporary identity (GUTI) to the UE, the allocated GUTI may be included in the TAU Accept message.

When the UE has included the eDRX parameter information in the TAU request message, the MME includes the eDRX parameter information in the TAU Accept message if the MME determines that eDRX is enabled.

When the TAU Accept message is received and ISR activated indication is not included in the TAU Accept message, the UE sets TIN to globally unique temporary identity (GUTI).

21. When the GUTI is included in the TAU Accept message, the UE transmits a TAU Complete message to the MME in response to the TAU Accept message.

When a serving node (e.g., MME/SGSN or C-SGN) needs to notify the SCEF of change of the serving node, the serving node may transmit the Update Location message for reporting change of the serving node to the SCEF in the procedure of FIG. 20. This will be described below with reference to the drawing.

FIG. 21 shows a serving node relocation method according to an embodiment of the present invention.

Referring to FIG. 21, steps 1 to 12 of FIG. 20 are performed.

12a. When the serving node of the UE is changed (i.e., when the serving node which has received the TAU/RAU request message differs from the old node) and connection for transmission/reception of non-IP data via the SCEF is configured for the UE, the serving node transmits the Update Location message to the SCEF to notify the SCEF of change of the serving node.

For example, when an SDT monitoring event configured for the UE is present in the MME and notification about serving node change is configured by the operator, the serving node may transmit the Update Location message to the SCEF in order to indicate serving node change (i.e., MME identifier and C-SGN identifier).

Alternatively, when the type of PDN connection currently set between the UE and the SCS/AS through the procedure of FIG. 18 is "non-IP" and the PDN connection is established via the SCEF, the serving node may transmit the Update Location message to the SCEF in order to indicate serving node change (i.e., MME identity and C-SGN identity).

Here, the serving node may determine whether connection for transmission/reception of non-IP data through the SCEF has been configured between the UE and the SCS/AS using UE context received through the Context Response message from the old node. More specifically, the serving node may determine that connection for transmission/reception of non-IP data has been configured for the UE by receiving UE context including information about non-IP PDN connection from the old node. In addition, the serving node may determine that connection for transmission/reception of non-IP data has been configured through the SCEF when the subscription information corresponding to the APN with respect to the PDN connection, received from the HSS, includes Invoke SCEF Selection.

12b. The serving node receives an Update Location Acknowledgement message in response to the Update Location message. That is, the SCEF acknowledges successful location update.

Then, steps 13 to 21 of FIG. 20 are performed.

Although FIG. 21 shows that steps 12a and 12b are performed after steps 1 to 12 and then steps 12 to 21 are performed, steps 12a and 12b may be performed in a different order. Furthermore, steps 12a and 12b may be performed after completion of the TAU/RAU procedure.

In addition, in the case of a TAU/RAU procedure for CIoT, interaction with the P-GW, PCRF and the like in the conventional TAU/RAU procedure may be skipped.

As described above, the SCEF recognizes the newest serving node and thus non-IP data transmission can be performed without loss in mobile termination call transmission.

In high latency communication (HLcom), UE reachability and availability after DDN failure monitoring events may be used for stabilized mobile terminated (MT) data transmission of the SCS/AS. In this case, when the MME recognizes serving node change, the MME may notify the SCEF of serving node identity (MME identity) along with UE reachability.

This may be added at the request of the SCS/AS or SCEF or always added for non-IP data transmission. That is, the MME may indicate identity of the current serving node (e.g., MME identity, C-SGN identity) along with UE reachability when indicating the UE reachability.

In general, HLcom has been used for IP packet transmission through SGi interface, but it is necessary to apply the HLcom function to a case in which the MME transmits/receives data to/from the SCEF as non-IP packet transmission is required in Release-13.

However, if the SCS/AS configures a UE reachability monitoring event for DL packet transmission and then is informed of reachability, but a serving node to which DL packets need to be transmitted has been changed, the old node is required to transmit data. Consequently, data transmission may fail.

Accordingly, it is necessary to include serving node information (i.e., serving node identity) in a monitoring indication message and to transmit the message including the serving node information to the SCEF when the event is reported (i.e., the monitoring indication message is transmitted). This will be described below with reference to the drawing.

FIG. 22 shows a serving node relocation method according to an embodiment of the present invention.

1a. A node (i.e., MME/SGSN (in the case of 1a)) in which a monitoring event is configured detects the monitoring event.

2a. The MME/SGSN transmits a monitoring indication message (an SCEF reference ID, a monitoring event report and serving node identity) to the SCEF. When the monitoring event configuration has been triggered by a one-time monitoring request, the monitoring event configuration is cleared by the MME/SGSN when this step is completed. If the MME/SGSN has a maximum number of reports stored for this monitoring task, the MME/SGSN decreases the maximum number of reports by 1.

Here, serving node information (i.e., serving node identity) may be included in the monitoring indication message and transmitted each time. When the SCS/AS requests indication of serving node change (i.e., indication of serving node change to the SCEF and/or the SCS/AS is requested), the monitoring indication message may include the serving node information. Alternatively, the monitoring indication message may include serving node information only when the serving node when the previous monitoring event is reported is changed.

2b. The HSS transmits the monitoring indication message (SCEF Reference ID and monitoring event report to the SCEF. If the monitoring event configuration is triggered by a one-time monitoring request, the monitoring event configuration is cleared by the HSS when this step is completed. If the HSS has a maximum number of reports stored for this monitoring task, the HSS decreases the value by 1.

3. The SCEF retrieves a related SCS/AS reference ID along with a monitoring destination address or an SCS/AS address as a destination for transmission of the monitoring indication message using the SCEF reference ID. The SCEF transmits a monitoring indication message (SCS/AS reference ID, external ID or MSISDN and monitoring Information) to the identified destination.

When the number of continuous monitoring requests reaches the maximum number of reports or in the case of a one-time monitoring request, the SCEF requests that the HSS (in the case of a monitoring event configured through the HSS) or MME(s)/SGSN(s) (in the case of a monitoring event directly configured by the MME/SGSN) clear the related monitoring event configuration and the monitoring event configuration according to steps 3 to 8 in the procedure of FIG. 13.

That is, when the MME transmits the monitoring indication message as in step 2a, the MME transmits the serving node identity (e.g., MME/SGSN/C-SGN identity) along with the monitoring indication message to the SCEF. Then, the SCEF may update information of the previous serving node and transmit MT data (e.g., Non-IP data and small data) to the newest serving node.

The operation of additionally transmitting the serving node identity as described above may also be performed when a UE reachability event or an availability after DDN failure monitoring event is used.

Furthermore, when packet data is transmitted to the MME/C-SGN through the SCEF instead of SGi, the operation of additionally transmitting serving node identity may also be performed.

FIG. 23 shows a serving node relocation method according to an embodiment of the present invention.

Referring to FIG. 23, a serving node (e.g., MME/SGSN or C-SGN) transmits an Update Location message to the SCEF (S2301).

Here, the Update Location message may be transmitted during the TAU procedure as shown in FIG. 21, but may be transmitted after the TAU procedure is completed.

In other words, the UE performs a successful TAU/RAU procedure and the new serving node receives the Invoke SCEF Selection indicator and subscription information for non-IP PDN/PDP connection to an APN correlated with the related SCEF ID (identifier). Then, the procedure of FIG. 23 may be performed.

In the following description, the new node shown in FIG. 23 is referred to as a first serving node and the old node is referred to as a second serving node.

Here, after the first serving node receives a TAU request message from the UE, the first serving node may transmit an Update Location Request to the home subscriber server (HSS) when the first serving node differs from the second serving node.

On the other hand, when the first serving node differs from the second serving node and connection for transmission/reception of non-IP data via the SCEF is configured for the UE, the first serving node may transmit an Update Location message to the SCEF.

That is, the first serving node may not transmit the Update Location message to the SCEF when connection for transmission/reception of non-IP data is not configured for the UE even when serving nodes change due to the TAU procedure, differently from the Update Location Request transmitted to the HSS.

When the first serving node differs from the second serving node during the TAU procedure, the first serving node may transmit a context request message to the second serving node in order to retrieve UE context. In addition, the first serving node may receive a context response message including the UE context from the second serving node in response to the context request message. Here, the first serving node may determine whether connection for transmission/reception of non-IP data via the SCEF has been configured for the UE using the UE context.

More specifically, when the type of PDN connection between the UE and a packet data network (PDN) is "non-IP" and subscription information corresponding to the PDN connection includes the Invoke SCEF Selection indicator, it can be determined that connection for transmission/reception of non-IP data via the SCEF has been configured for the UE.

In other words, when subscription information corresponding to a default APN for "non-IP" PDN type or an APN requested by the UE includes the Invoke SCEF Selection indicator, the new serving node generates PDN/PDP connection to the SCEF using previously allocated EBI (refer to FIG. 18). The new serving node may perform this operation by transmitting the Update Location message to the SCEF.

The Update Location message may include at least one of user identity, EBI, SCEF ID, APN, serving PLMN ID, and international mobile station equipment identity (IMEISV).

When the SCEF has received the reachable for NIDD flag for the UE from the old serving node but has not received an NIDD Submit Indication message from the old serving node and is buffering non-IP data, the SCEF may perform the procedure shown in FIG. 19 from step 7.

The reachable for NIDD flag refers to a flag indicating that the MME notifies the SCEF of UE reachability when the MME determines that the UE is reachable.

If an IWK-SCEF receives the Update Location message from the serving node, the IWK-SCEF may deliver the message to the SCEF.

The first serving node receives an Update Location Acknowledgement message from the SCEF in response to the Update Location message (S2302).

The Update Location Acknowledgement message may correspond to a message for confirming establishment of PDN connection to the SCEF for the UE.

The SCEF may generate an SCEF EPS bearer context for a user identified through user identity. Here, the SCEF EPS bearer context may include at least one of user identity, an APN, an EBI, an NIDD charging ID, serving node information (a serving node address used for SCEF connection, a serving PLMN ID (mobile country code (MCC)+mobile network code (MNC)) for a serving PLMN) and IMEISV.

The Update Location Acknowledgement message may include at least one of the user identity, the EBI, the SCEF ID, cause and the NIDD charging ID.

If the IWK-SCEF receives the Update Location Acknowledgement message from the SCEF, the IWK-SCEF may deliver the message to the serving node.

Thereafter, when the first serving node receives non-IP data to be transmitted to the corresponding UE from the SCEF, the first serving node encrypts the non-IP data, performs integrity protection and then transmits the non-IP data to an eNB using a NAS PDU delivered through a downlink S1-AP message. The NAS PDU including non-IP data is transmitted to the UE through a downlink RRC message.

Similarly, the UE transmits the NAS PDU including the non-IP data to the eNB through an uplink RRC message. The eNB transmits the NAS PDU including the non-IP data to the first serving node in an uplink S1-AP message.

The above-described serving node relocation procedure may be applied when T6a/T6b PDN/PDP connection is configured for a UE which has performed a successful TAU procedure for a new MME or a successful RAU procedure for a new SGSN.

Meanwhile, the terms "Update Location message" and "Update Location Ack message" are exemplary and different terms may be used. For example, the Update Location message may be referred to as an Update Serving Node Information Request message and the Update Location Ack message may be referred to as an Update Serving Node Information Response message.

Overview of Devices to which the Present Invention can be Applied

FIG. 24 illustrates a block diagram of a communication device according to one embodiment of the present invention.

With reference to FIG. 24, a wireless communication system comprises a network node 2410 and a plurality of UEs 2420.

A network node 2410 comprises a processor 2411, memory 2412, and communication module 2413. The processor 2411 implements proposed functions, processes and/or methods proposed through FIG. 1 to FIG. 23. The processor 2411 can implement layers of wired/wireless interface protocol. The memory 2412, being connected to the processor 2411, stores various types of information for driving the processor 2411. The communication module 2413, being connected to the processor 2411, transmits and/or receives wired/wireless signals. Examples of the network node 2410 include an eNB, MME, HSS, SGW, PGW, application server and so on. In particular, in case the network node 2410 is an eNB, the communication module 2413 can include a Radio Frequency (RF) unit for transmitting/receiving a radio signal.

The UE 2420 comprises a processor 2421, memory 2422, and communication module (or RF unit) 2423. The processor 2421 implements proposed functions, processes and/or methods proposed through FIG. 1 to FIG. 23. The processor 2421 can implement layers of wired/wireless interface protocol. The memory 2422, being connected to the processor 2421, stores various types of information for driving the processor 2421. The communication module 2423, being connected to the processor 2421, transmits and/or receives wired/wireless signals.

The memory 2412, 2422 can be installed inside or outside the processor 1411, 1421 and can be connected to the processor 2411, 2421 through various well-known means. Also, the network node 2410 (in the case of an eNB) and/or the UE 2420 can have a single antenna or multiple antennas.

FIG. 25 illustrates a block diagram of a wireless communication apparatus according to an embodiment of the present invention.

Particularly, in FIG. 25, the UE described above FIG. 24 will be exemplified in more detail.

Referring to FIG. 25, the UE includes a processor (or digital signal processor) 2510, RF module (RF unit) 2535, power management module 2505, antenna 2540, battery 2555, display 2515, keypad 2520, memory 2530, Subscriber Identification Module (SIM) card 2525 (which may be optional), speaker 2545 and microphone 2550. The UE may include a single antenna or multiple antennas.

The processor 2510 may be configured to implement the functions, procedures and/or methods proposed by the present invention as described in FIG. 1-23. Layers of a wireless interface protocol may be implemented by the processor 2510.

The memory 2530 is connected to the processor 2510 and stores information related to operations of the processor 2510. The memory 2530 may be located inside or outside the processor 2510 and may be connected to the processors 2510 through various well-known means.

A user enters instructional information, such as a telephone number, for example, by pushing the buttons of a keypad 2520 or by voice activation using the microphone 2550. The microprocessor 2510 receives and processes the instructional information to perform the appropriate function, such as to dial the telephone number. Operational data may be retrieved from the SIM card 2525 or the memory module 2530 to perform the function. Furthermore, the processor 2510 may display the instructional and operational information on the display 2515 for the user's reference and convenience.

The RF module 2535 is connected to the processor 2510, transmits and/or receives an RF signal. The processor 2510 issues instructional information to the RF module 2535, to initiate communication, for example, transmits radio signals comprising voice communication data. The RF module 2535 comprises a receiver and a transmitter to receive and transmit radio signals. An antenna 2540 facilitates the transmission and reception of radio signals. Upon receiving radio signals, the RF module 2535 may forward and convert the signals to baseband frequency for processing by the processor 2510. The processed signals would be transformed into audible or readable information outputted via the speaker 2545.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:

1. A method for relocating, by a first serving node, a serving node in a wireless communication system, the method comprising:
receiving a tracking area update (TAU) request message from a user equipment (UE);
transmitting an update location request to a home subscriber server (HSS), when the first serving node having received the TAU request message is different from a second serving node that is an old node; and
transmitting an update location message to a service capability exposure function (SCEF), when the first serving node is different from the second serving node that is the old node and a connection for transmitting/receiving non-Internet protocol (non-IP) data via the SCEF is configured for the UE.

2. The method of claim 1, further comprising:
transmitting a context request message to the second serving node in order to retrieve a UE context, when the first serving node is different from the second serving node that is the old node; and
receiving a context response message including the UE context from the second serving node in response to the context request message,
wherein whether the connection for transmitting/receiving non-IP data is configured for the UE is determined using the UE context.

3. The method of claim 2, wherein it is determined that the connection for transmitting/receiving non-IP data via the SCEF is configured for the UE, when the type of a packet data network (PDN) connection between the UE and a packet data network (PDN) is non-IP, and subscription information corresponding to the PDN connection includes an Invoke SCEF Selection indicator.

4. The method of claim 1, wherein the update location message is transmitted to the SCEF, when notification to the SCEF for a relocation of the serving node is configured in the first serving node.

5. The method of claim 1, further comprising receiving an update location acknowledgement message for acknowledging location update from the SCEF in response to the update location message.

6. The method of claim 1, further comprising including non-IP data to be transmitted to the UE in a non-access stratum packet data unit (NAS PDU) and transmitting the NAS PDU including the non-IP data to the UE when the non-IP data is received from the SCEF.

7. A first serving node for relocating a serving node in a wireless communication system, the node comprising:
a communication module for transmitting/receiving signals; and
a processor for controlling the communication module,
wherein the processor is configured:
to receive a tracking area update (TAU) request message from a UE;
to transmit an update location request to a home subscriber server (HSS), when the first serving node having received the TAU request message is different from a second serving node that is an old node; and
to transmit an update location message to a service capability exposure function (SCEF) when the first serving node having received the TAU request message is different from the second serving node that is the old node and a connection for transmitting/receiving non-Internet protocol (non-IP) data via the SCEF is configured for the UE.

8. The first serving node of claim 7, wherein the processor is configured:
to transmit a context request message to the second serving node in order to retrieve a UE context, when the first serving node is different from the second serving node that is the old node; and
to receive a context response message including the UE context from the second serving node in response to the context request message,
wherein whether the connection for transmitting/receiving non-IP data is configured for the UE is determined using the UE context.

9. The first serving node of claim 8, wherein it is determined that the connection for transmitting/receiving non-IP data via the SCEF is configured for the UE, when the type of a PDN connection between the UE and a packet data network (PDN) is non-IP, and subscription information corresponding to the PDN connection includes an Invoke SCEF Selection indicator.

10. The first serving node of claim 7, wherein the processor is configured to receive an update location acknowledgement message for acknowledging location update from the SCEF in response to the update location message.

* * * * *